(12) United States Patent
Lee et al.

(10) Patent No.: US 9,749,575 B1
(45) Date of Patent: Aug. 29, 2017

(54) DISPLAY DEVICE AND OPERATING METHOD THEREOF

(71) Applicant: LG ELECTRONICS INC., Seoul (KR)

(72) Inventors: Seunghun Lee, Seoul (KR); Hyojung Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/260,766

(22) Filed: Sep. 9, 2016

(30) Foreign Application Priority Data

Feb. 15, 2016 (KR) .................. 10-2016-0017443

(51) Int. Cl.
*H04N 5/45* (2011.01)
*H04N 5/445* (2011.01)
*H04N 5/50* (2006.01)
*G06F 3/0346* (2013.01)
*H04N 5/44* (2011.01)

(52) U.S. Cl.
CPC ............. *H04N 5/45* (2013.01); *G06F 3/0346* (2013.01); *H04N 5/4403* (2013.01)

(58) Field of Classification Search
CPC ........ H04N 5/45; H04N 5/4403; H04N 5/445; H04N 5/44513; H04N 5/44543; H04N 5/44504; H04N 5/44591; H04N 5/268; H04N 5/50; H04N 2005/44595; G06F 3/0346
USPC .... 348/563–565, 569, 705, 706; 725/37, 38, 725/40, 41, 43, 48, 49, 51, 52, 59, 85, 725/100, 131, 133, 139, 141, 151, 153
See application file for complete search history.

(56) References Cited

U.S. PATENT DOCUMENTS

| 9,319,734 B2 | 4/2016 | Hong et al. |
| 2011/0310308 A1 | 12/2011 | Asayama et al. |
| 2014/0009394 A1 | 1/2014 | Lee et al. |

(Continued)

FOREIGN PATENT DOCUMENTS

| JP | 2013-187841 | 9/2013 |
| JP | 2015-027003 | 2/2015 |

(Continued)

OTHER PUBLICATIONS

International Search Report issued in PCT/KR2016/009932 dated Jan. 6, 2017.

*Primary Examiner* — Sherrie Hsia
(74) *Attorney, Agent, or Firm* — KED & Associates LLP

(57) ABSTRACT

A display device includes: a display unit configured to display an image of media content; an external device interface unit configured to receive an image signal outputted from an external device connected to the display device; and a control unit configured to control the display unit and the external device interface unit. The control unit displays a plurality of external input items, receives an instruction for positioning a pointer to one item among the plurality of external input items, displays a plurality of external input switching options on an external input item where the pointer is disposed according to the received instruction, and performs a function corresponding to a selected external input switching option among the plurality of external input switching options based on the image signal outputted from the external device.

18 Claims, 25 Drawing Sheets

(56) References Cited

U.S. PATENT DOCUMENTS

| | | | |
|---|---|---|---|
| 2014/0055675 A1* | 2/2014 | An | H04N 5/44504 348/569 |
| 2015/0067729 A1* | 3/2015 | Yoon | G06F 3/0482 725/37 |
| 2015/0229987 A1* | 8/2015 | Kim | H04N 21/4316 725/34 |
| 2016/0098963 A1* | 4/2016 | Kim | H04N 5/57 345/690 |

FOREIGN PATENT DOCUMENTS

| | | |
|---|---|---|
| KR | 10-2014-0008568 | 1/2014 |
| KR | 10-2014-0147112 | 12/2014 |

\* cited by examiner

FIG. 7A
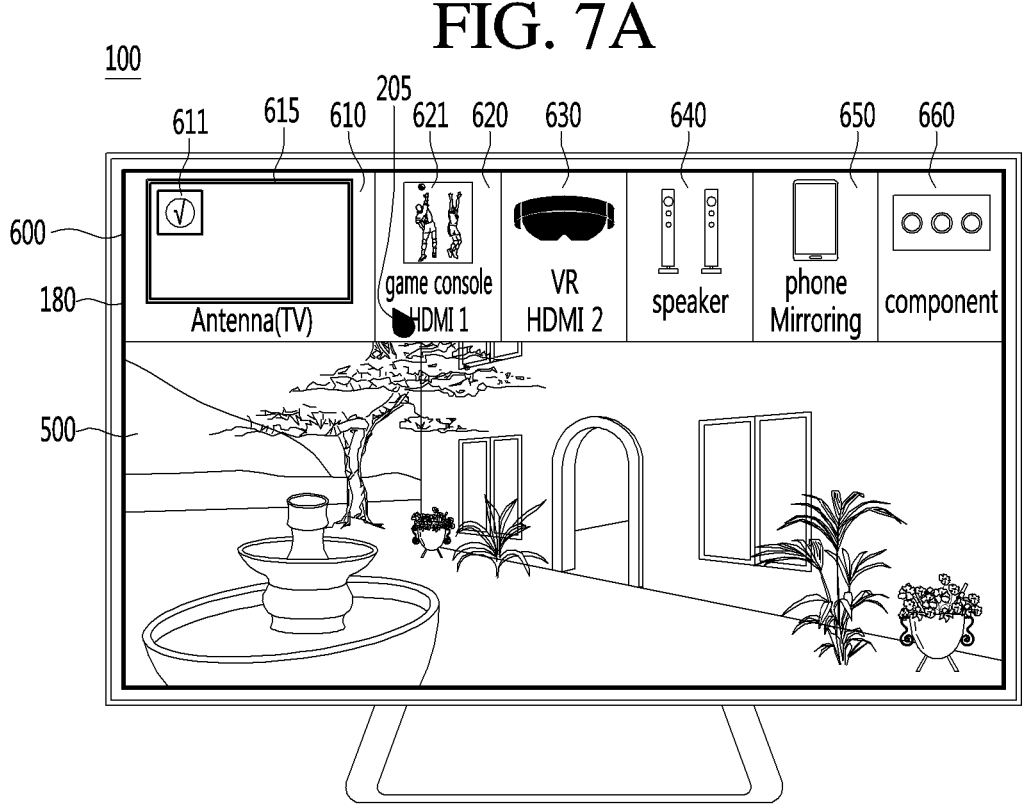
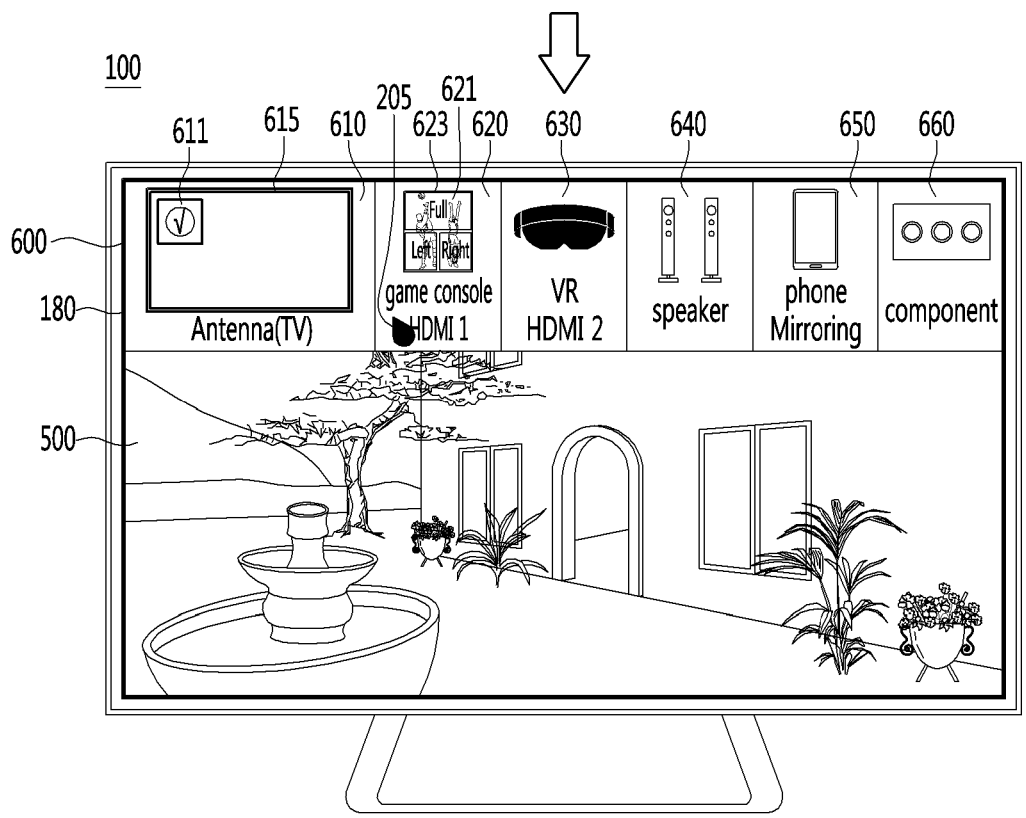

FIG. 8A
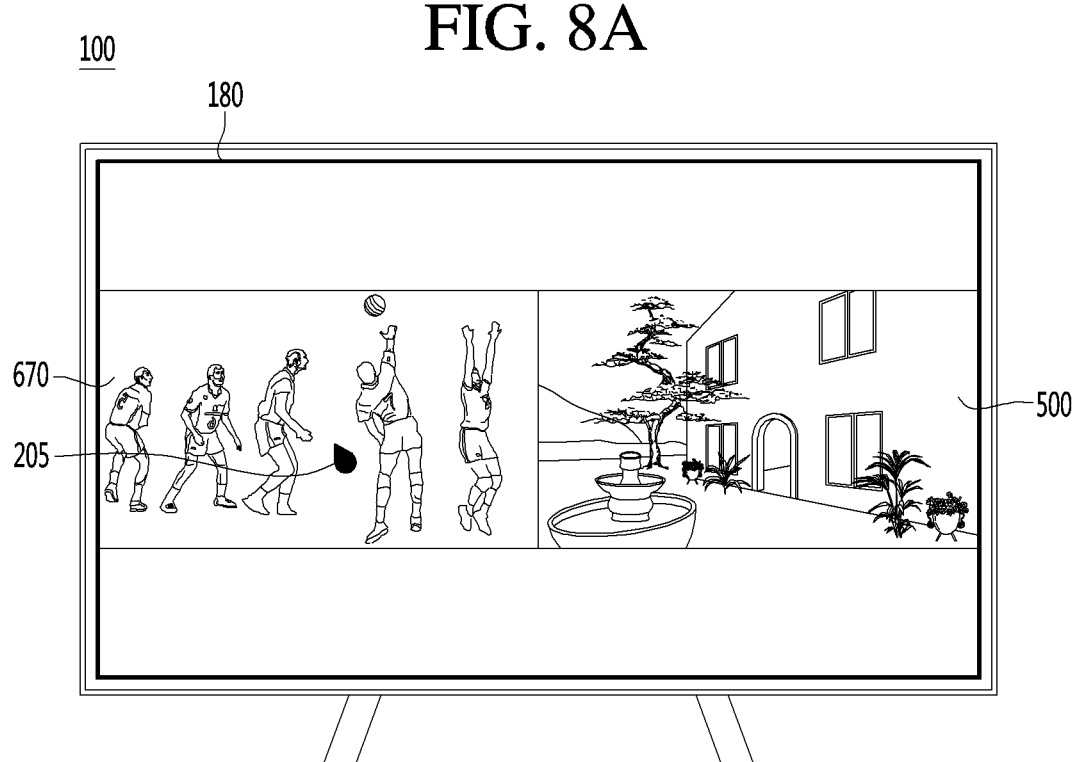
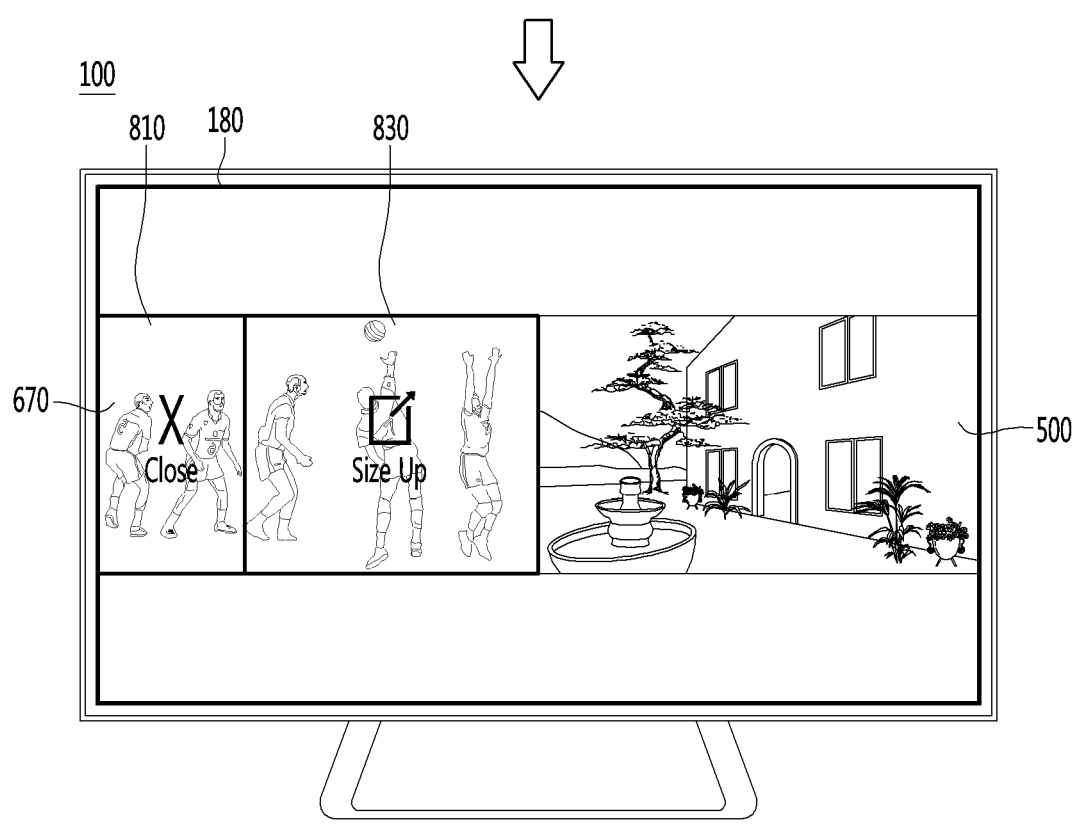

FIG. 8B
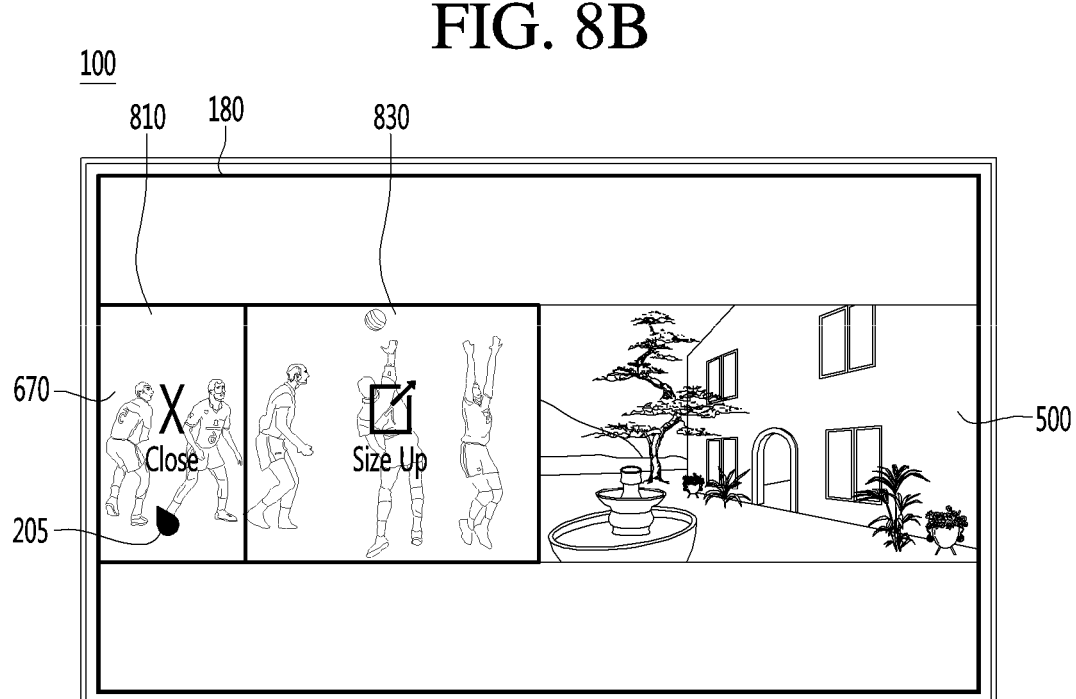
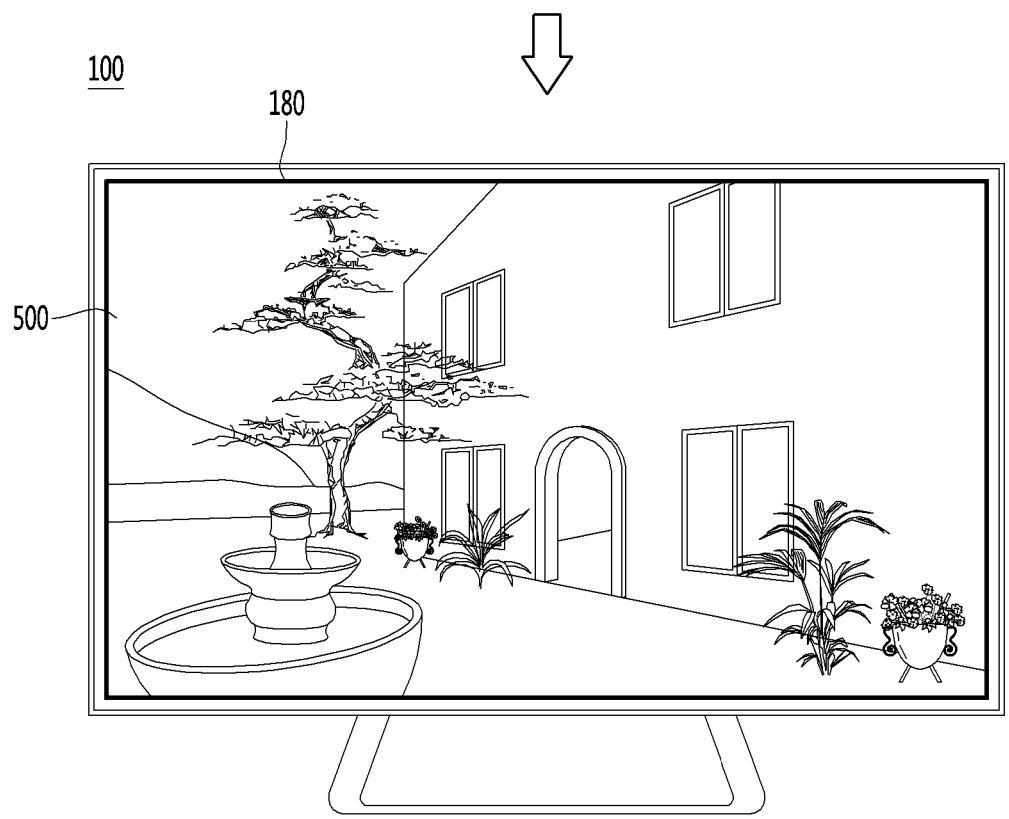

FIG. 8C
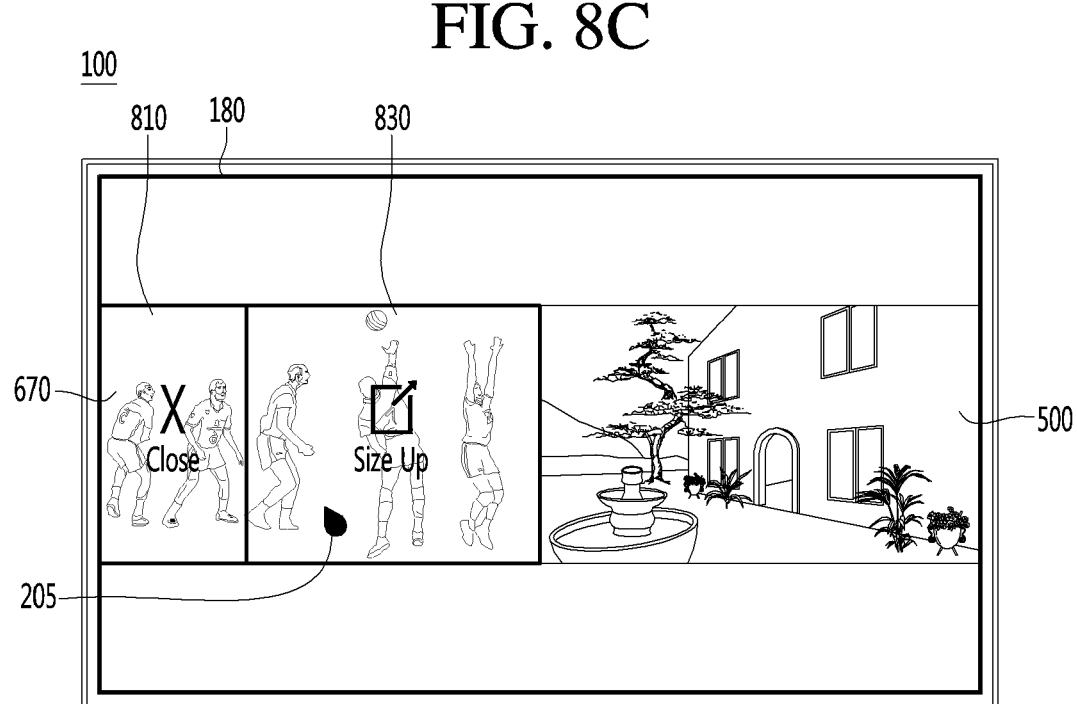
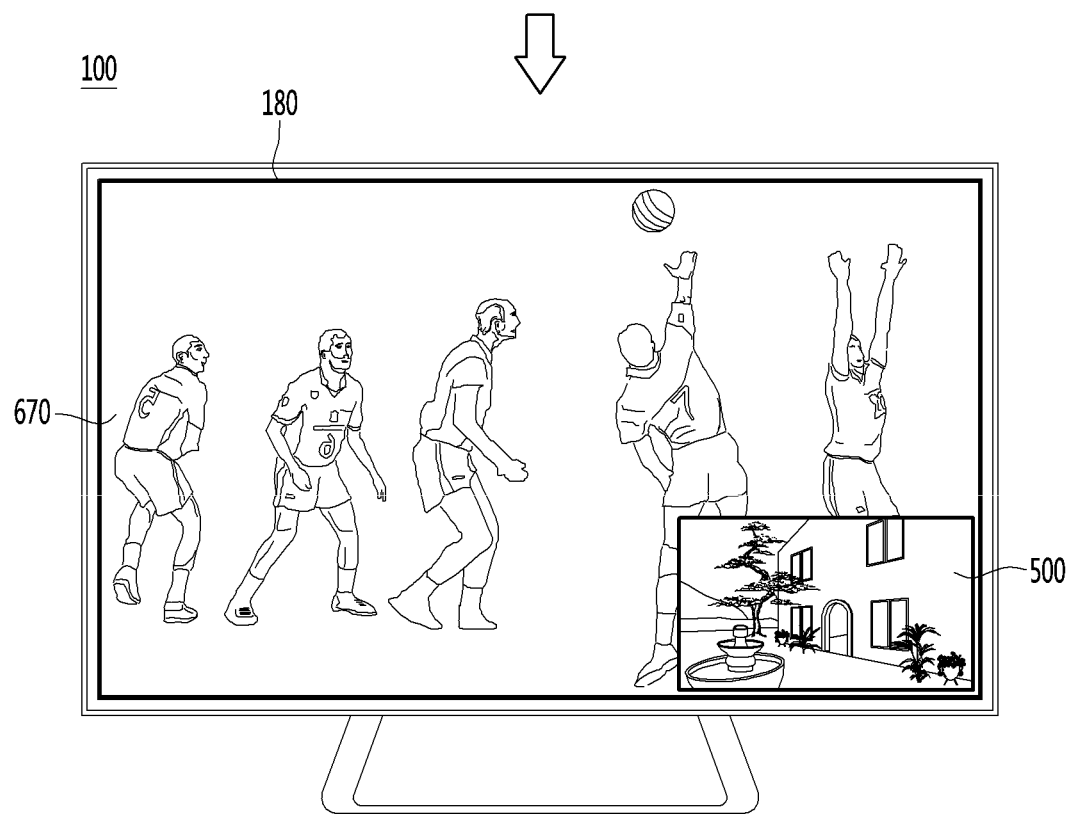

FIG. 9A
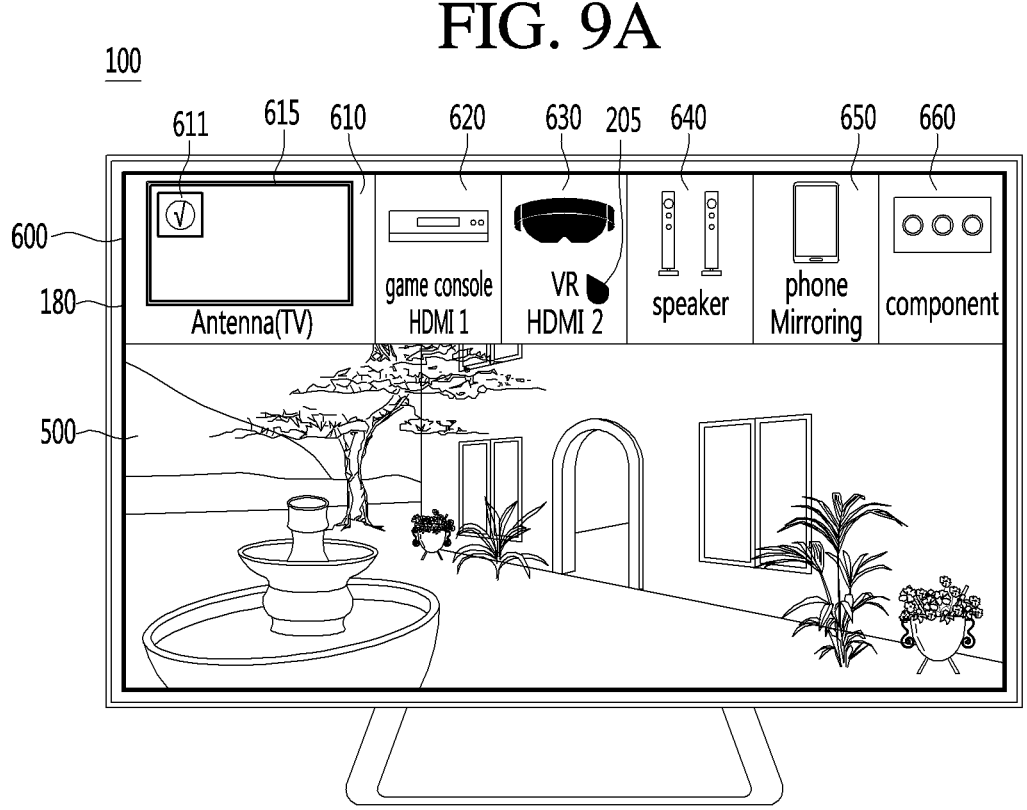
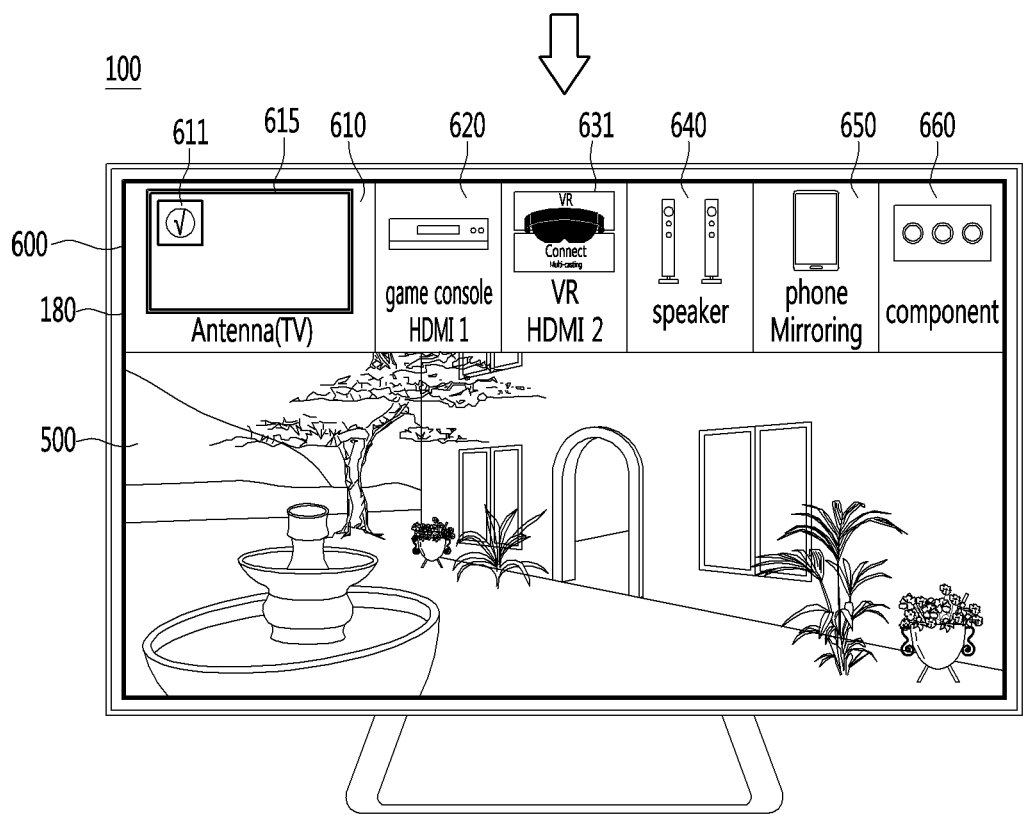

FIG. 10A
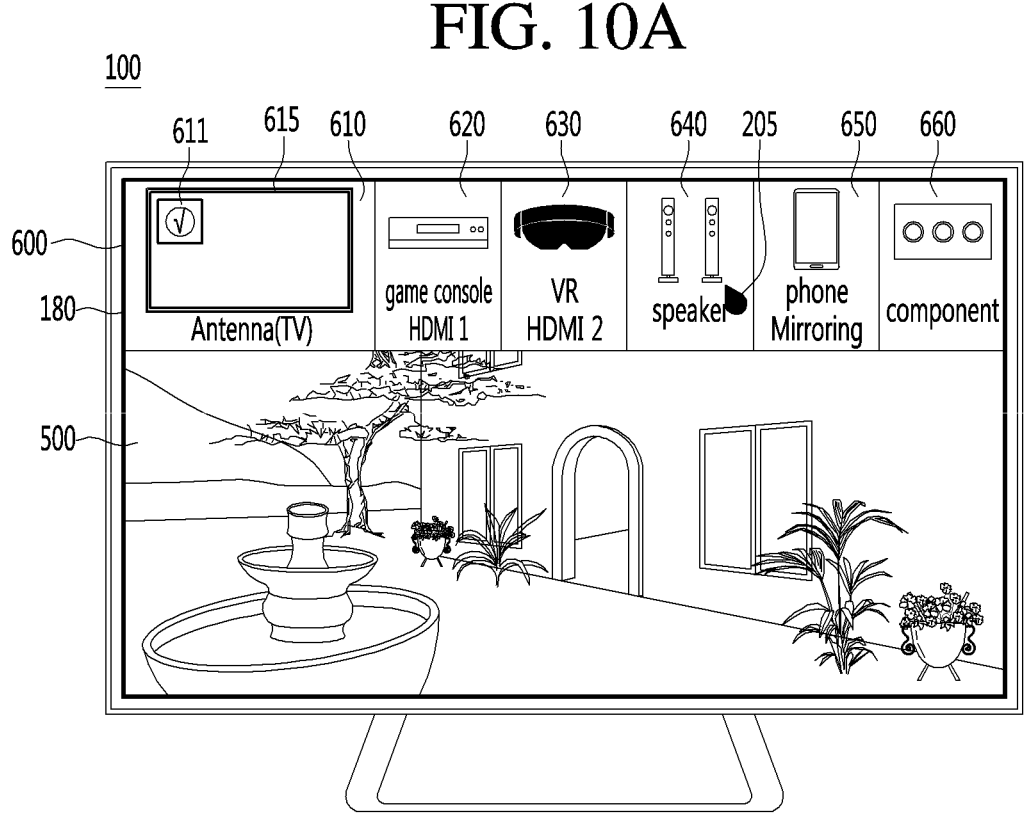
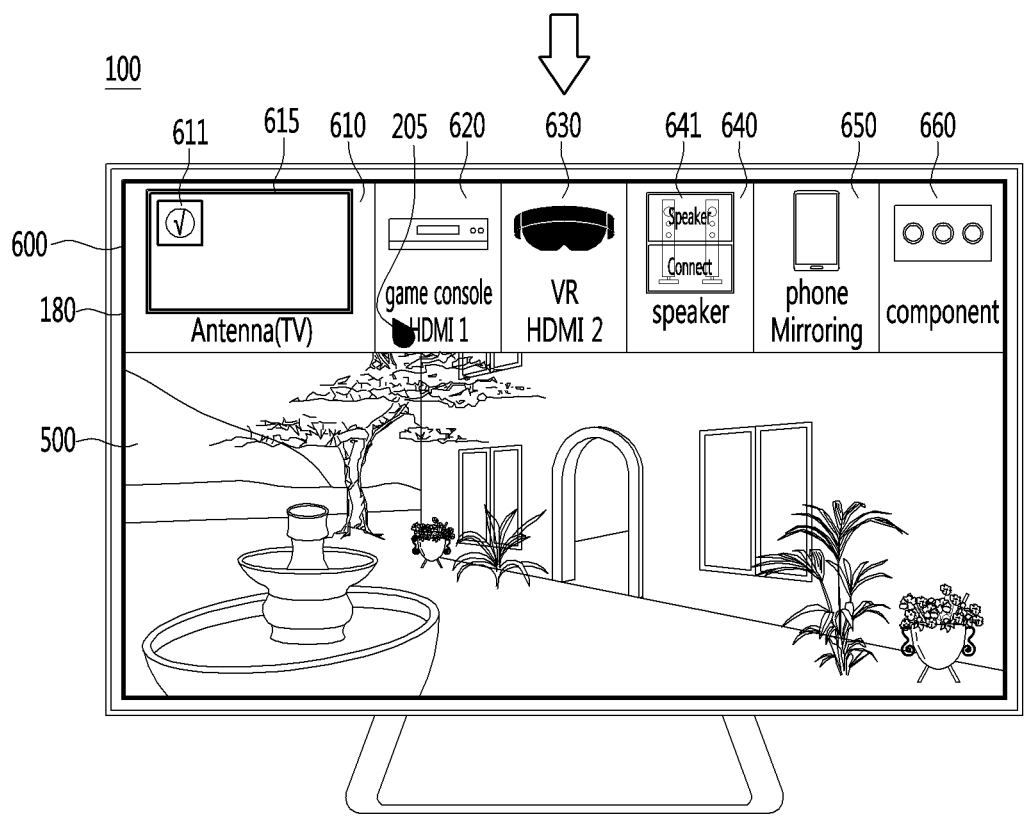

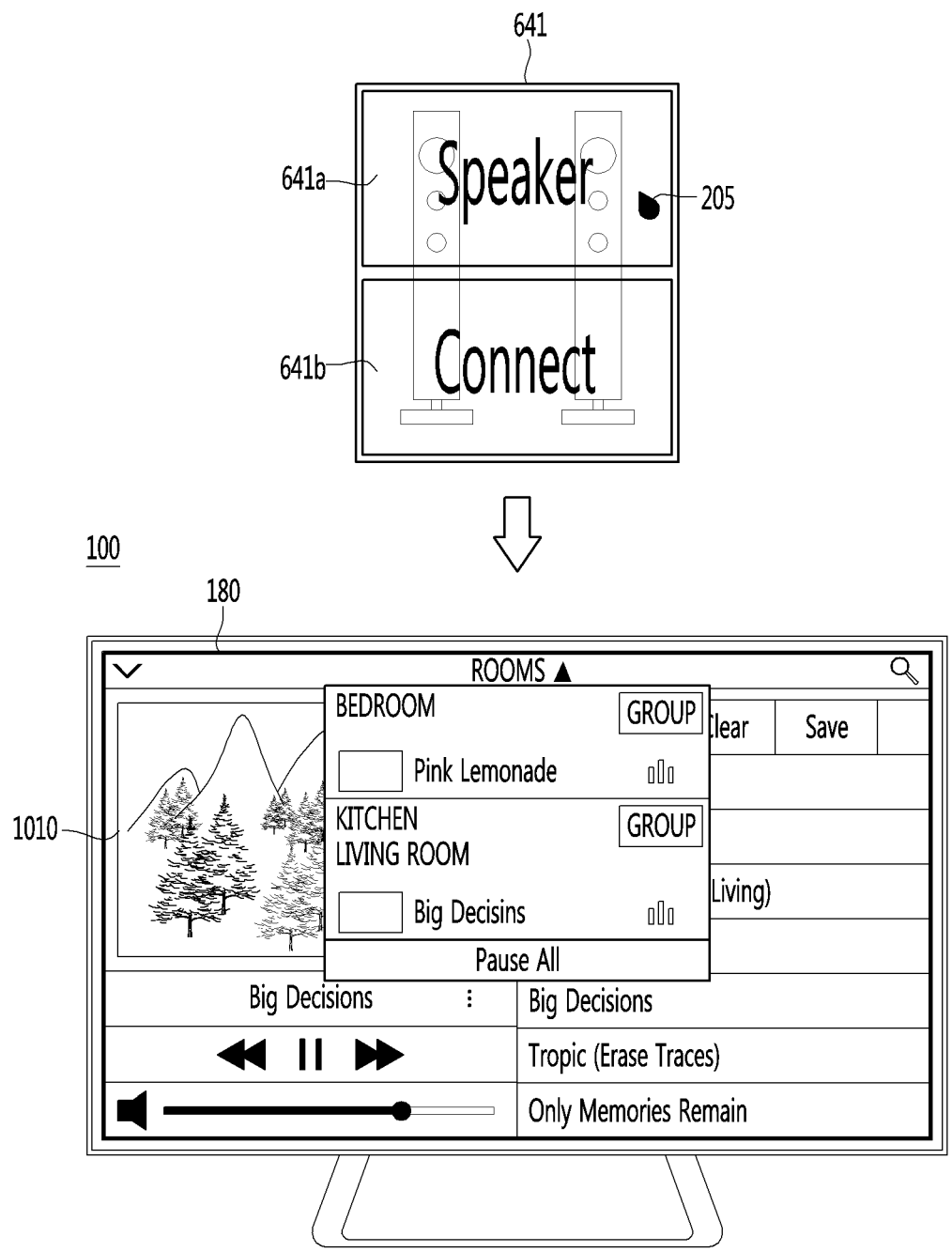

DISPLAY DEVICE AND OPERATING METHOD THEREOF

CROSS-REFERENCE TO RELATED APPLICATION(S)

The present application claims priority under 35 U.S.C. 119 and 35 U.S.C. 365 to Korean Patent Application No. 10-2016-0017443, filed Feb. 15, 2016, which is hereby incorporated by reference in its entirety.

BACKGROUND

1. Field

The present disclosure relates to a display device and an operating method thereof.

2. Background

Digital TV services using wired or wireless communication networks are becoming common. The digital TV services can provide various services that conventional analog broadcasting services cannot provide.

For example, Internet Protocol Television (IPTV) and smart TV services, that is, types of digital TV services, provide interactivity that allows users to actively select the types, watching times, and so on of watching programs. The IPTV and smart TV services can provide various additional services, for example, internet search, home shopping, and online game, based on such interactivity.

Additionally, recently, an image on an external device connected to a display device can be viewed through the large screen of the display device by using an external input menu.

However, if an external input item is selected from an external input menu, a typical display device is limited to a function for switching to an image of an external input corresponding to the selected external input item. Accordingly, there are limitations in that a user utilizes an external input image actively and variously.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements and wherein:

FIGS. 7A to 7D are views illustrating an example for utilizing an external input switching option relating to an arrangement of an image provided from an external device according to an embodiment of the present invention;

FIGS. 8A to 8C are views illustrating an example for changing the disposition of each image in a multi view environment according to an embodiment of the present invention;

FIGS. 9A to 9C are views illustrating an example for utilizing an external input switching option relating to the transmission of an image provided from an external device according to an embodiment of the present invention;

FIGS. 10A to 10D are views illustrating an example for utilizing an external input switching option relating to the transmission of an image or audio provided from an external device according to an embodiment of the present invention.

DETAILED DESCRIPTION

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote controller as an internet function is added while fulfilling the broadcast receiving function. Then, with the support of a wired or wireless internet function, it is possible to perform an e-mail, web browsing, banking, or game function in access to internet and computers. In order for such various functions, standardized general purpose OS can be used.

Accordingly, since various applications are freely added or deleted on a general purpose OS kernel, a display device described in this present invention, for example, can perform various user-friendly functions. The display device, in more detail, can be network TV, HBBTV, smart TV, LED TV, OLED TV, and so on and in some cases, can be applied to a smartphone.

Figure 1:
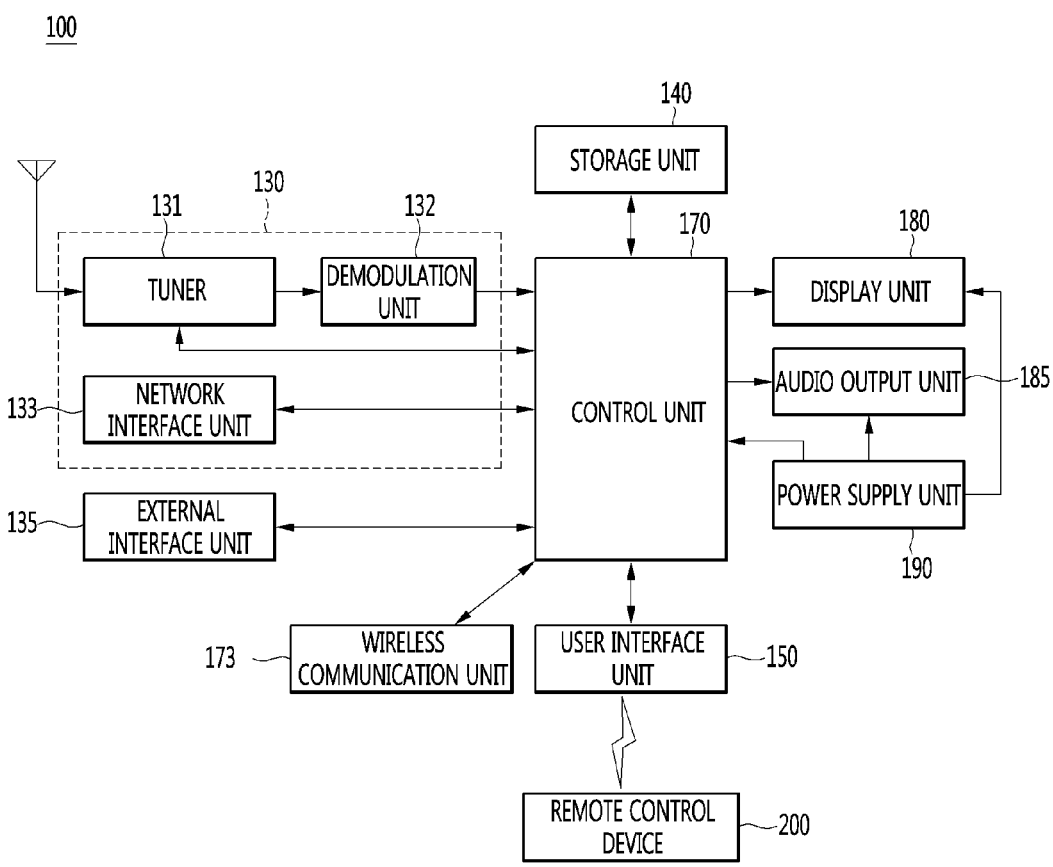
FIG. 1 is a block diagram illustrating a configuration of a display device according to an embodiment of the present invention.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user input interface unit 150, a control unit 170, a wireless communication unit 173, a display unit 180, an audio output unit 185, and a power supply unit 590.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface 135 can provide a connection path between the display device 100 and an external device. The external device interface 135 can receive at least one of image and audio outputted from an external device that is wirelessly or wiredly connected to the display device 100 and deliver it to the control unit. The external device interface unit 135 can include a plurality of external input terminals. The plurality of external input terminals can include an RGB terminal, at least one High Definition Multimedia Interface (HDMI) terminal, and a component terminal.

An image signal of an external device inputted through the external device interface unit 135 can be outputted through the display unit 180. A sound signal of an external device inputted through the external device interface unit 135 can be outputted through the audio output unit 185.

An external device connectable to the external device interface unit 135 can be one of a set-top box, a Blu-ray player, a DVD player, a game console, a sound bar, a smartphone, a PC, a USB Memory, and a home theater system but this is just exemplary.

The network interface unit 133 can provide an interface for connecting the display device 100 to a wired/wireless network including internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily store image, voice, or data signals outputted from the external device interface unit 135 or the network interface unit 133 and can store information on a predetermined image through a channel memory function.

The storage unit 140 can store an application or an application list inputted from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals inputted from a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user input interface unit 150 can deliver, to the control unit 170, control signals inputted from local keys (not shown) such as a power key, a channel key, a volume key, and a setting key.

Image signals that are image-processed in the control unit 170 can be inputted to the display unit 180 and displayed as an image corresponding to corresponding image signals. Additionally, image signals that are image-processed in the control unit 170 can be inputted to an external output device through the external device interface unit 135.

Voice signals processed in the control unit 170 can be outputted to the audio output unit 185. Additionally, voice signals processed in the control unit 170 can be inputted to an external output device through the external device interface unit 135.

Besides that, the control module 170 can control overall operations in the display device 100.

Additionally, the control unit 170 can control the display device 100 by a user command or internal program inputted through the user input interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user input interface unit 150, the control unit 170 can output image signals or voice signals of an external device such as a camera or a camcorder, which are inputted through the external device interface unit 135, through the display unit 180 or the audio output unit 185.

Moreover, the control unit 170 can control the display unit 180 to display images and control broadcast images inputted through the tuner 131, external input images inputted through the external device interface unit 135, images inputted through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content inputted from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or OSD signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
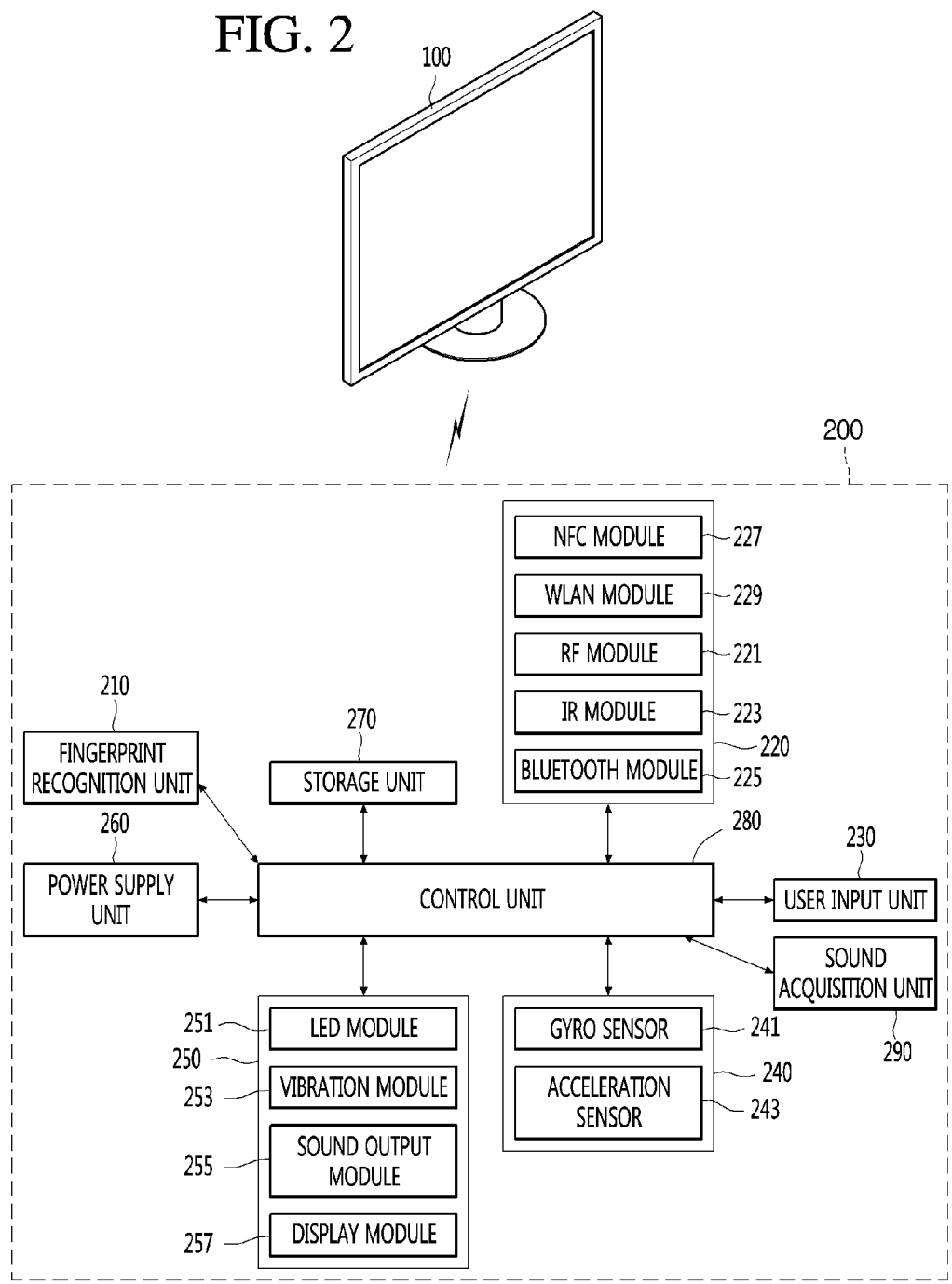
FIG. 2 is a block diagram illustrating a remote control device according to an embodiment of the present disclosure.
Figure 3:
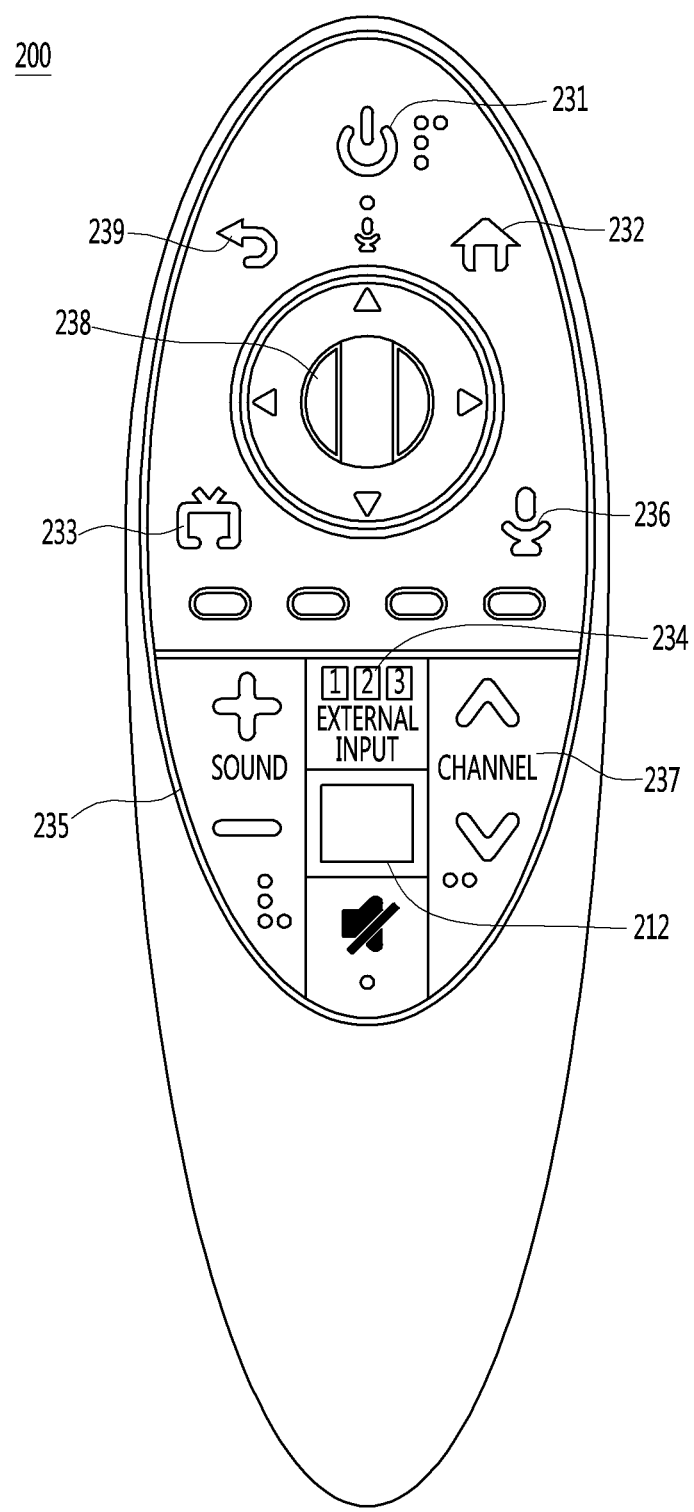
FIG. 3 is a view illustrating an actual configuration of a remote control device according to an embodiment of the present disclosure.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 225 transmits/receives signals to/from an arbitrary any one of display devices according to the above-mentioned embodiments of the present invention.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The power button 232 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 based on x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to a control of the remote control device 200. The control unit 280 can transmit a signal corresponding to a predetermined key manipulation of the user input unit 235 or a signal corresponding to a movement of the remote control device 200 sensed by the sensor unit 240 to the display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

Figure 4:
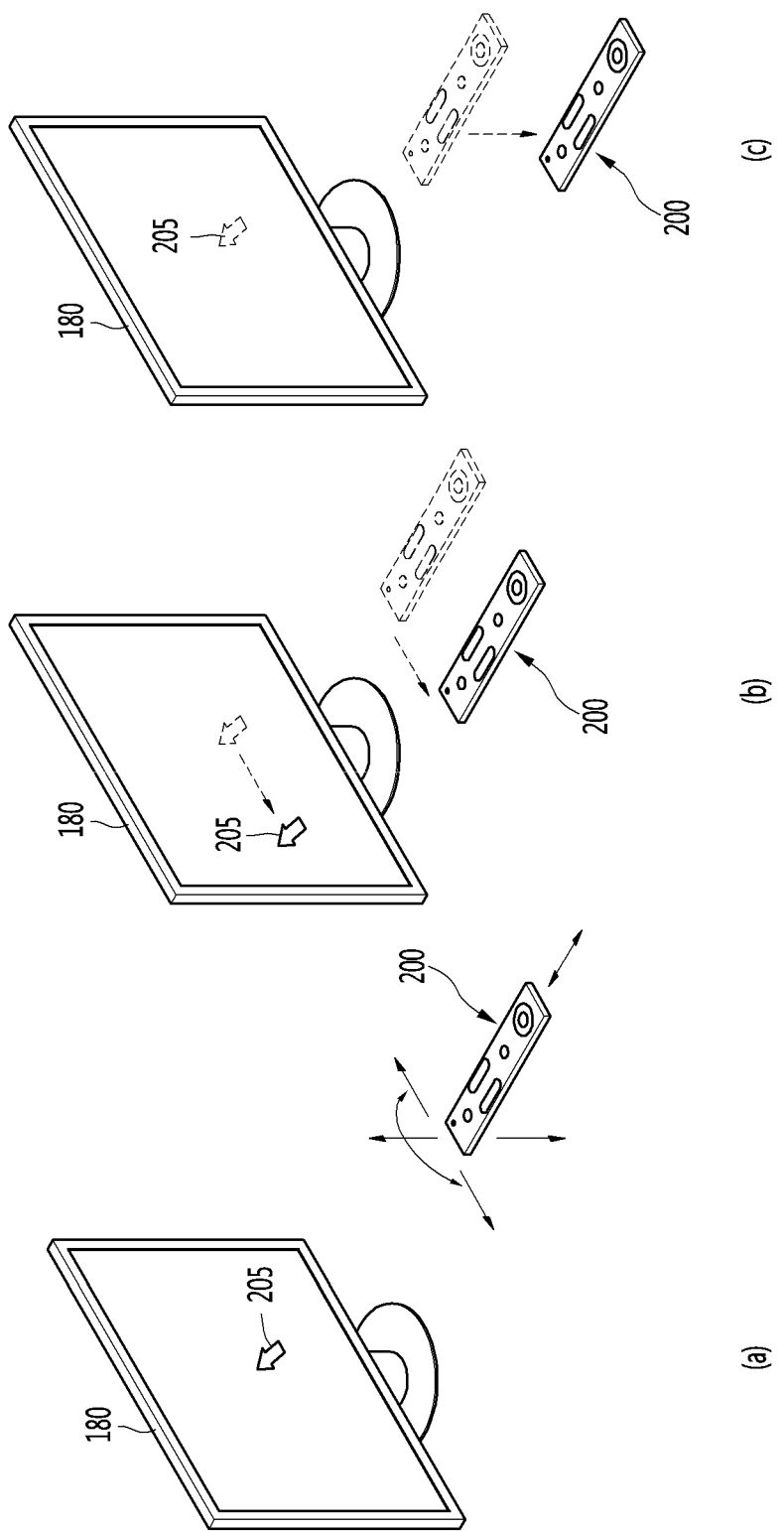
FIG. 4 is a view of utilizing a remote control device according to an embodiment of the present invention.

Then, FIG. 4 is described.

FIG. 4 is a view of utilizing a remote control device according to an embodiment of the present invention.

FIG. 4A illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display unit 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display unit 180. Thus, a selection area in the display unit 180 corresponding to the pointer 205 can be zoomed in and displayed largely.

On the other hand, if a user moves the remote control device 200 close to the display unit 180, a selection area in the display unit 180 corresponding to the pointer 205 can be zoomed out and displayed reduced.

On the other hand, if the remote control device 200 is away from the display unit 180, a selection area can be zoomed out and if the remote control device 200 is close to the display unit 180, a selection area can be zoomed in.

Additionally, if a specific button in the remote control device 200 is pressed, the recognition of a vertical or horizontal movement can be excluded. That is, if the remote control device 200 is moved away from or close to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Then, an operating method of a system according to an embodiment of the present invention will be described with reference to FIG. 5.

Figure 5:
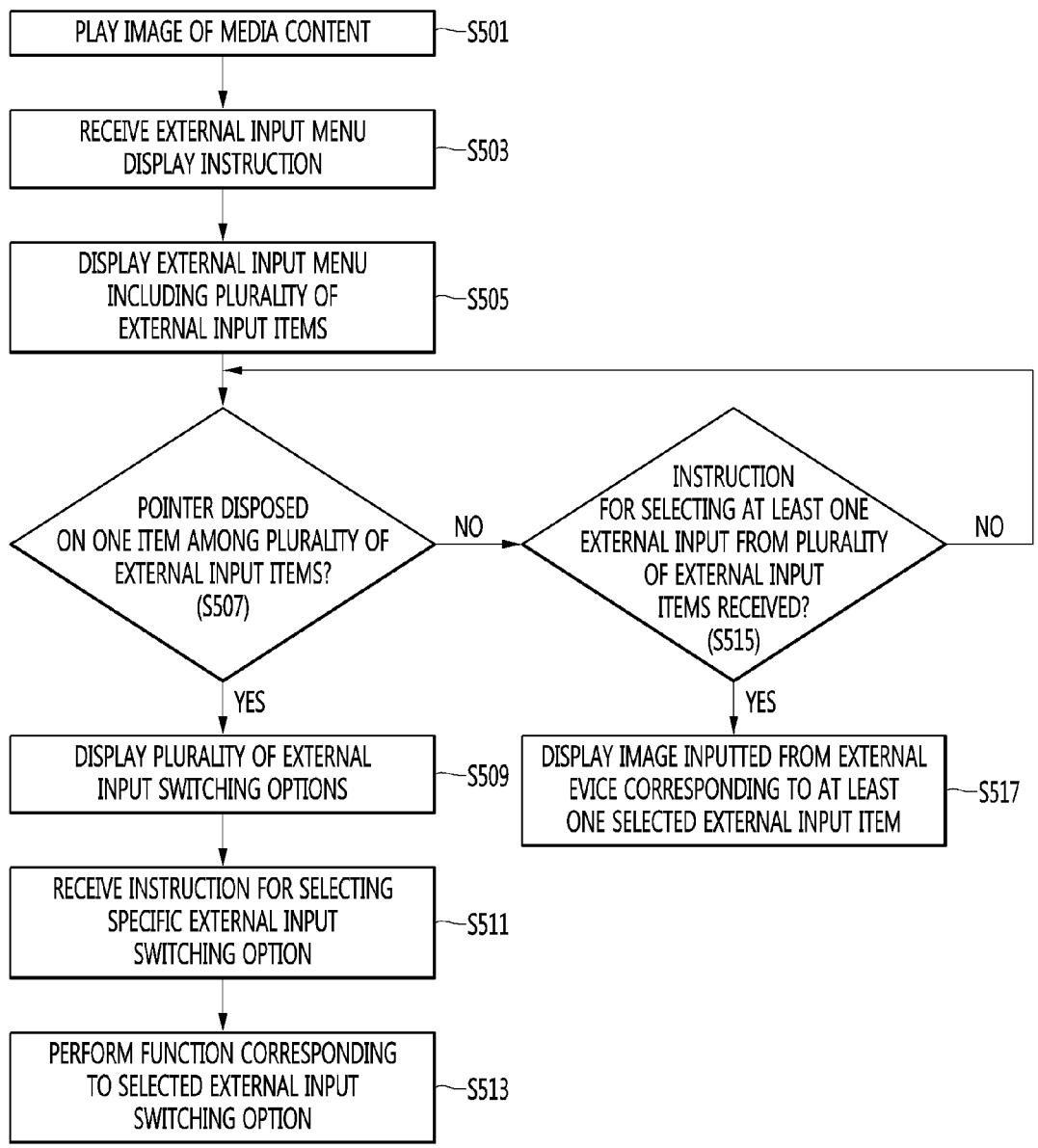
FIG. 5 is a flowchart illustrating an operating method of a display device according to an embodiment of the present invention.

FIG. 5 is a flowchart illustrating an operating method of a display device according to an embodiment of the present invention.

Referring to FIG. 5, the control unit 170 of the display device 100 plays an image of media content through the display unit 180 in operation S501. According to an embodiment, the media content can be a broadcast program included in broadcast signals received through the tuner 131.

According another embodiment, the media content can be a picture or an image received from an external device such as a set-top box connected to the display device 100.

Hereinafter, it is assumed and described that the display device 100 plays an image 500 of media content but the present invention is not limited thereto. That is, the display device 100 can perform operations described later in a state of displaying a home screen or a standby screen.

The control unit 170 of the display device 100 receives an instruction for displaying an external input menu in operation S503 and displays an external input menu including a plurality of external input items according to the received instruction in operation S505. According to an embodiment, the control unit 170 can receive an instruction for displaying an external input menu from the remote control device 200. A user can call an external input menu by pressing a button (not shown) equipped at the remote control device 200.

Operations S501 and S505 will be described with reference to FIGS. 6A and 6B.

Figure 6A:
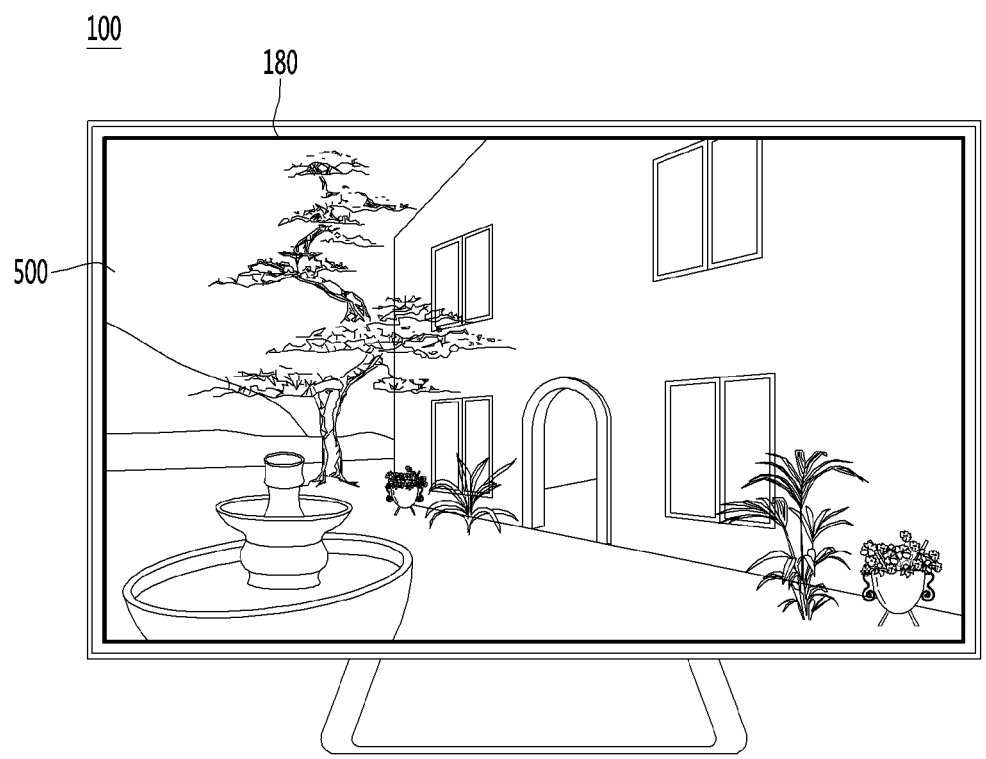
FIGS. 6A and 6B are views illustrating an example for displaying an external input menu during the playback of media content according to an embodiment of the present invention.
Figure 6B:
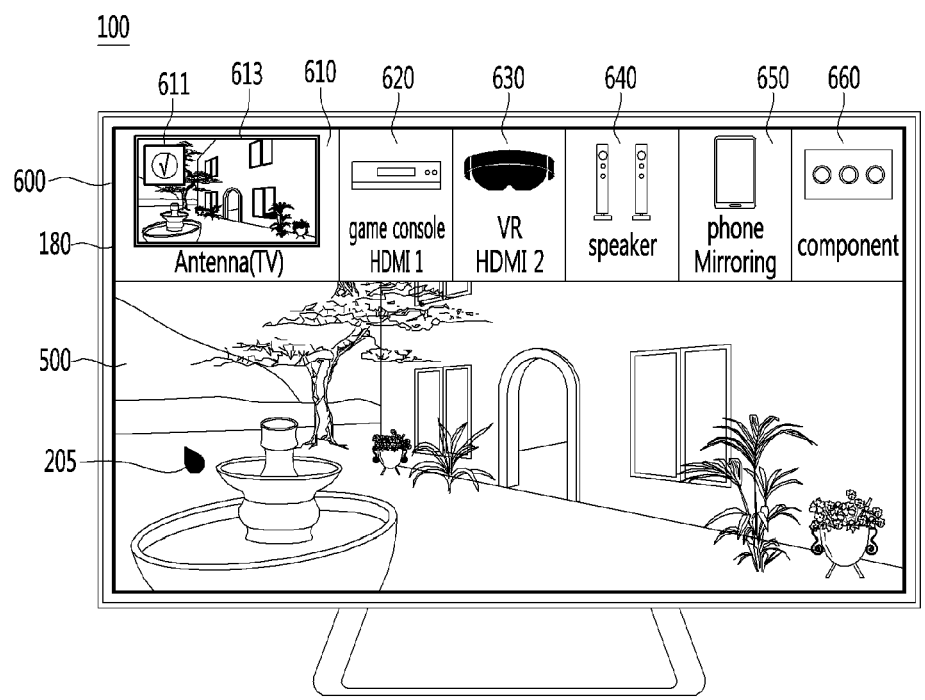

FIGS. 6A and 6B are views illustrating an example for displaying an external input menu during the playback of media content according to an embodiment of the present invention.

Referring to FIG. 6A, the control unit 170 of the display device 100 can display an image 500 of media content through the display unit 180. While displaying the image 500 of the media content, the control unit 170 can receive an instruction for displaying an external input menu from the remote control device 200.

As shown in FIG. 6B, the control unit 170 can display an external input menu 600 through the display unit 180 based on the received instruction. The external input menu 600 can be displayed overlapping on the image 500 of the media content. The external input menu 600 can be displayed in an On Screen Display (OSD) form. That is, a layer where the external input menu 600 is displayed can be different from a layer where the image 500 of the media content is displayed.

The external input menu 600 can be displayed at the screen upper side and this can be just exemplary. That is, the external input menu 600 can be displayed at one of the lower side, the right side, and the left side Referring to FIG. 6B, the external input menu 600 can include a plurality of external input items 610 to 660. Each external input item can include information on an external input. Each external input item can include information on an external input device connected to the display device 100 through the external device interface unit 135 or the wireless communication unit 173.

For example, each external input item can include at least one of the name of an external input terminal, the name of an external device connected through an external input terminal, and an image based on an image signal received from an external device connected to an external input terminal.

The first external input item 610 can be an image corresponding to an antennal or tuner 131 provided in the display device 100. In this case, the first external input item 610 cannot be an external input item strictly. An indicator 611 for representing that the image 500 of the media content is in playback through the current display unit 180 can be displayed on the first external input item 610. That is, the indicator 611 can be an identifier for representing which external input item is selected currently among the plurality of external input items 610 to 660. A thumbnail image 613 corresponding to one time point of the image 500 of the media content displayed through the display unit 180 can be displayed on the first external input item 610. If the image 500 of the media content is played for more than a predetermined time through the display unit 180, the thumbnail image 613 can be displayed on the first external input item 610. The thumbnail image 613 can be an image captured at a specific time point during the playback of the image 500 of the media content. Although a thumbnail image is described as one example in this present invention, the present invention is not limited thereto. That is, the image 500 of the media content instead of the thumbnail image 613 can be displayed on the first external input item 610 in real time.

The second external input item 620 can be an item for representing that a game console is connected through the HDMI 1 terminal of the external device interface unit 135. At least one of a game console image corresponding to a game console, the name of a game console, and the name of an external input terminal connected to a game console can be displayed on the second external input item 620.

The third external input item 630 can be an item for representing that a Virtual Reality (VR) device is connected through the HDMI 2 terminal of the external device interface unit 135. At least one of a VR device image corresponding to a VR device, the name of a VR device, and the name of an external input terminal connected to a VR device can be displayed on the third external input item 630.

The fourth external input item 640 can be an item for representing that an audio output device is connected through the external device interface unit 135 or the wireless communication unit 173. At least one of an image of an audio output device, the name of an audio output device, a wireless communication standard between an audio output device and the display device 100, and the name of an external input terminal connected to an audio output device can be displayed on the fourth external input item 640.

The fifth external input item 650 can be an item for sharing the screen of a mobile terminal connected through the wireless communication unit 173. That is, the fifth external input item 650 can be an item for representing a screen mirroring function for displaying a screen that a mobile terminal displays currently through the display unit 180. At least one of the name of a mobile terminal connected to the current display device 100 through the wireless communication unit 173 and a capture image for representing a state of capturing a screen that a mobile terminal displays currently can be displayed on the fifth external input item 650.

The sixth external input item 660 can be an item corresponding to a component terminal.

Additionally, referring to FIG. 6B, the display unit 180 can further display a pointer 205 that moves along a movement of the remote control device 200. The pointer 205 can be disposed at each external input item. A user can select a specific external input item through the pointer 205.

Again, FIG. 5 is described.

The control unit 170 of the display device 100 checks on which item among a plurality of external input items the pointer 205 is disposed in operation S507. According to an embodiment, if the pointer 205 is disposed on an item among the plurality of external input items, a corresponding external input item can be focused. That is, a corresponding external input item can be displayed different from other external input items. For example, an external input item where the pointer 205 is disposed can be highlighted and displayed. In more detail, a highlight box for surrounding an external input item where the pointer 205 is disposed can be displayed.

Additionally, according to an embodiment of the present invention, it is described that an operation of the display device 100 is controlled through the pointer 205 but the present invention is not limited thereto. That is, it is checked which external input item is highlighted through a highlight box movable through the remote control device 200.

If the pointer 205 is disposed on an item among a plurality of external input items, the control unit 170 of the display device 100 displays a plurality of external input switching options on a corresponding external input item in operation S509. According to an embodiment, an external input switching option can be an option for instructing which position of the display unit 180 an image provided from an external device corresponding to an external input item is to be displayed. That is, the external input switching option can be a screen layout option for instructing which area on a screen an image provided from an external device is to be disposed.

According to another embodiment, the external input switching option can be an option for displaying an image provided from an external device corresponding to an external input item on the display unit 180 or transmitting an image or audio of a media content being played by the display device 100 to a corresponding external device.

The external input switching option can vary according to the type of an external device connected to the display device 100. That is, the external input switching option can correspond to an external device connected to the display device 100.

This will be described later.

The control unit 170 of the display device 100 receives an instruction for selecting a specific external input switching option among a plurality of external input switching options in operation S511, and performs a function corresponding to the selected external input switching option according to the received instruction in operation S513. According to an embodiment, the control unit 170 can perform a function corresponding to the selected external input switching option based on at least one of image signals and audio signals outputted from an external device corresponding to an external input item.

Operations S507 to S513 will be described with reference to the accompanying drawings.

FIGS. 7A to 7D are views illustrating an example for utilizing an external input switching option relating to the disposition of an image provided from an external device according to an embodiment of the present invention.

Referring to FIG. 7A, the control unit 170 can receive an instruction for positioning the pointer 205 on the second external input item 620, from the remote control device 200. Accordingly, the pointer 205 displayed on a screen of the display unit 180 can be disposed on the second external input item 620. Accordingly, a thumbnail image 613 disposed on the first external input item 610 is not displayed and an image of the display device 100 corresponding to the first external input item 610 can be displayed. However, since the image 500 of the media content being played currently through the display unit 180 is provided from the display device 100, the indicator 611 can be displayed on the first external input item 610 as it was.

If the pointer 205 is disposed on the second external input item 620, the control unit 170 can display an image 621 based on an image signal received from a game console corresponding to the second external input item 620. The image 621 can be an image corresponding to one point of an image signal outputted from a game console connected to the display device 100. However, the present invention is not limited thereto and a video instead of the image 621 can be displayed. A user can identify at a glance which image is received from an external device corresponding to each external input item through the pointer 205.

Moreover, if the pointer 205 is disposed on the second external input item 620, it overlaps the image 621, so that the external input switching option 623 can be further displayed. If the pointer 205 is disposed on the image 621, or after the image 621 is displayed and a predetermined time elapses, the external input switching option 623 can be displayed.

The external input switching option 623 can be an option for instructing which position of the display unit 180 a game image received from a game console is to be disposed.

Figure 7B:
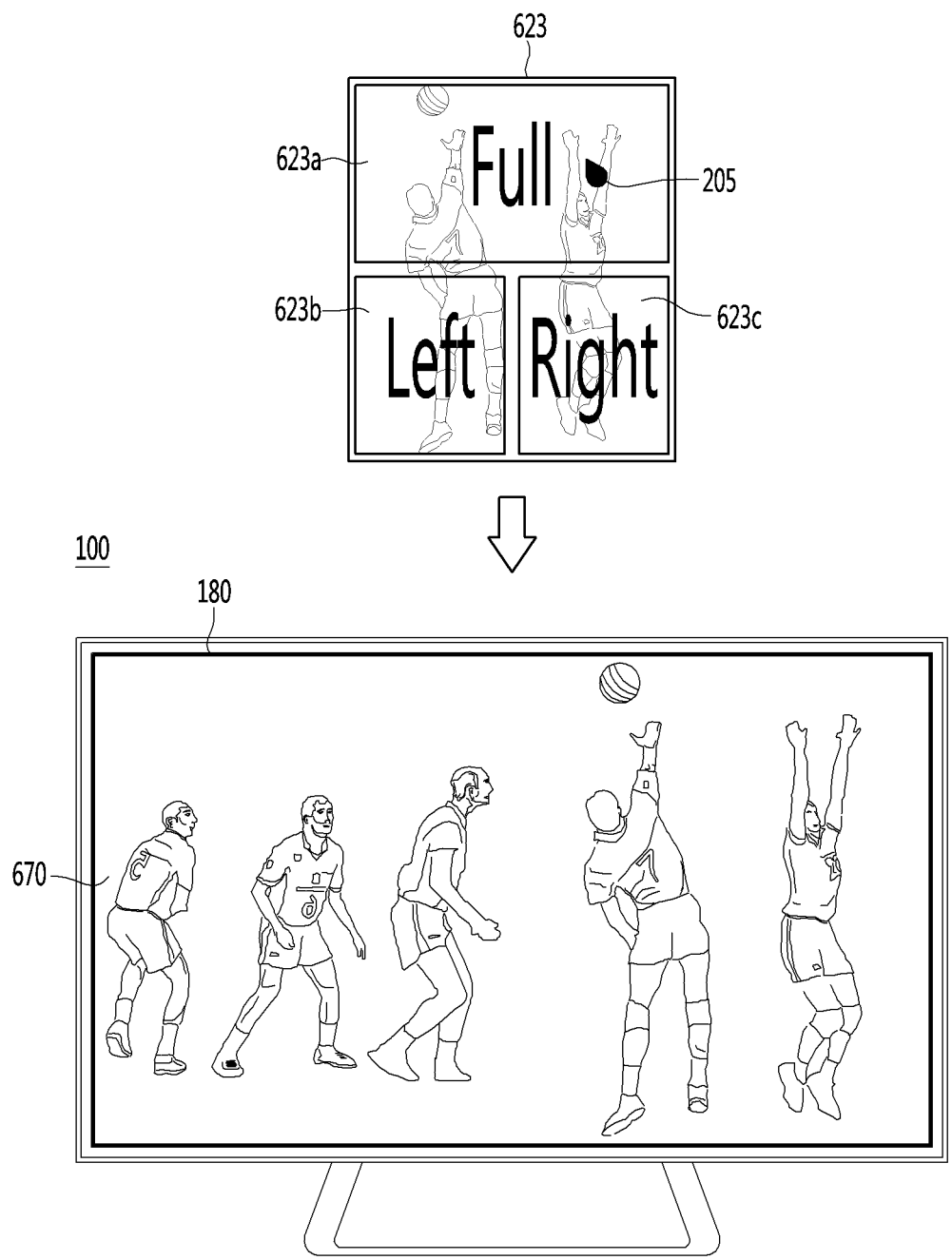

Referring to FIG. 7B, the external input switching option 623 can include a full screen option 623a, a left screen option 623b, and a right screen option 623c.

The full screen option 623a can be an option for displaying a game image provided from a game console on the entire screen of the display unit 180. If an instruction for selecting the full screen option 623a through the pointer 205 is received, the control unit 170, as shown in FIG. 7B, can display a game image 670 provided from a game console on the entire screen of the display unit 180. That is, while switching the image 500 of the currently-displayed media content to a game image, the control unit 170 can display the game image on the entire screen.

The left screen option 623b can be an option for displaying a game image provided from a game console on the divided left screen of the display unit 180. The entire screen of the display unit 180 can include a left screen and a right screen. The left screen and the right screen can be split screens.

Figure 7C:
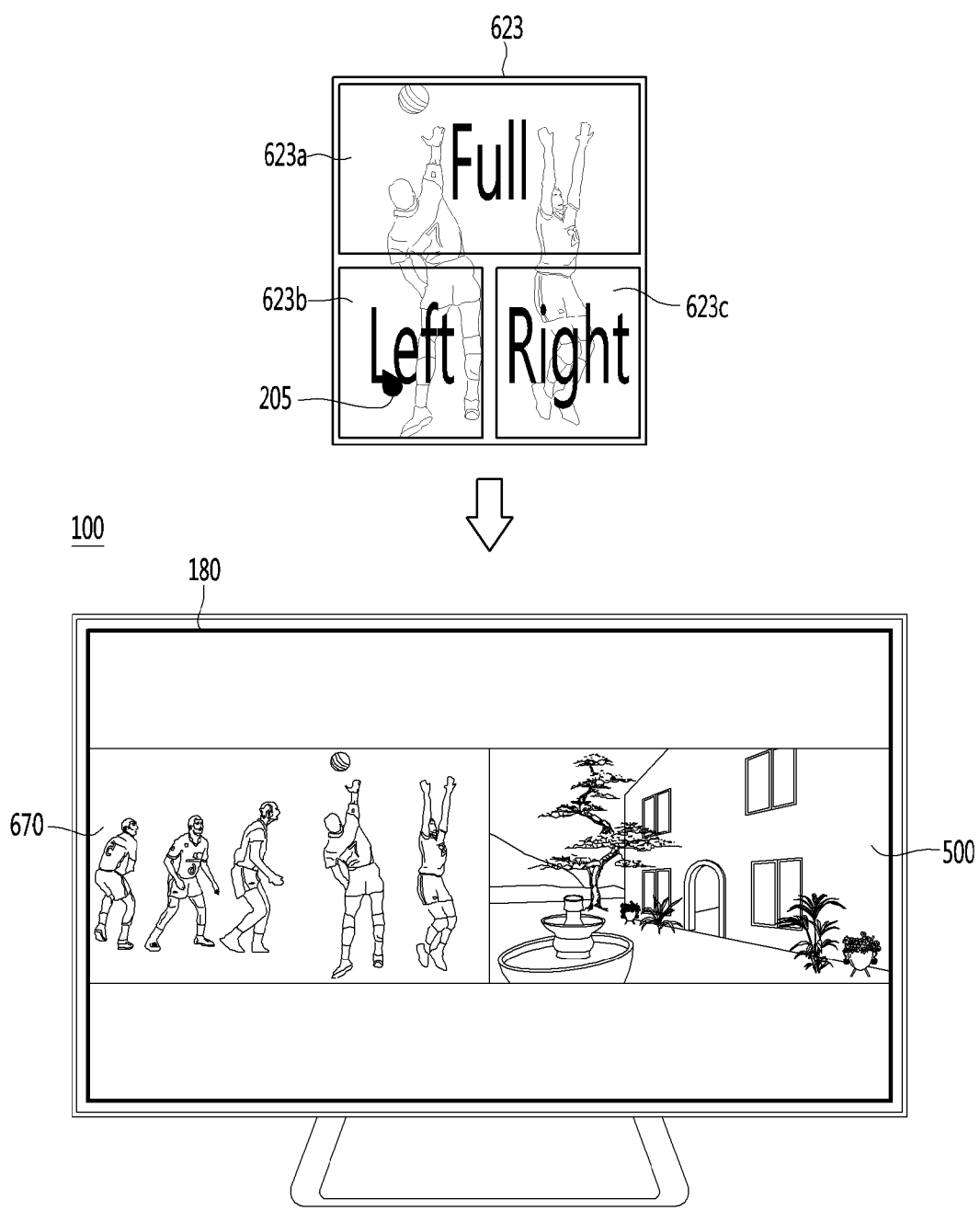

If an instruction for selecting the left screen option 623b through the pointer 205 is received, the control unit 170, as shown in FIG. 7C, can display the game image 670 provided from a game console on the left screen of the display unit 180 and display the image 500 of the currently-displayed media content on the right screen.

Figure 7D:
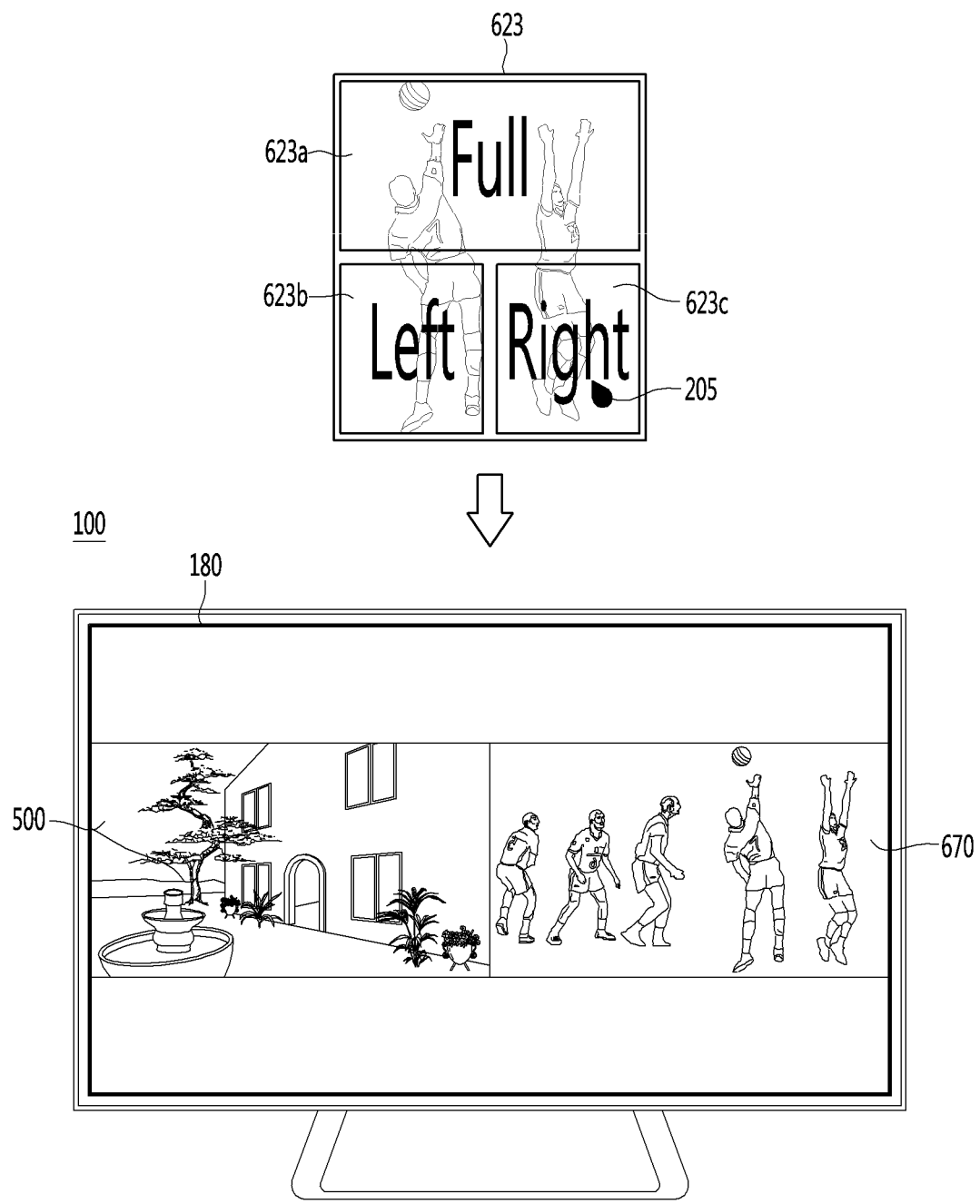

The right screen option 623c can be an option for displaying a game image provided from a game console on the divided right screen of the display unit 180. If an instruction for selecting the right screen option 623c through the pointer 205 is received, the control unit 170, as shown in FIG. 7D, can display the game image 670 provided from a game console on the right screen of the display unit 180 and display the image 500 of the currently-displayed media content on the left screen.

In such a way, while viewing a currently-played image, a user can view an image provided from an external device through the external input switching option 623 relating to the disposition of an image provided from an external device.

Moreover, the disposition of each image can be changed in a multi view environment.

FIGS. 8A to 8C are views illustrating an example for changing the disposition of each image in a multi view environment according to an embodiment of the present invention.

Referring to FIG. 8A, the display unit 180 can play a game image 670 provided from a game console on the left screen and play the image 500 of media content provided through the tuner 131 on the right screen at the same time. If an instruction for positioning the pointer 205 to the left screen where the game image 670 is being displayed is received, as shown in FIG. 8A, the control unit 170 can display a close option 810 and a size up option 830 on the left screen.

The close option 810 can be an option for terminating the viewing of the game image 670. As shown in FIG. 8B, if the close option 810 is selected, the control unit 170 can terminate the playing of the game image 670 and display the image 500 of media content on the entire screen. That is, if the close option 810 is selected, the control unit 170 cannot display the game image 670 and display the image 500 of the media content on the entire screen.

The size up option 830 can be an option for displaying the game image 670 on the entire screen of the display unit 180 and displaying the image 500 of the media content in a PIP form. As shown in FIG. 8C, if the size up option 830 is selected, the control unit 170 can display the image 500 of the media content in one area of the entire screen while displaying the enlarged game image 670 on the entire screen of the display unit 180. Herein, the image 500 of the media content can be displayed in a Picture In Picture (PIP) form.

In such a way, a user can receive various viewing experiences by using an option provided under a multi view environment.

Then, an example of another external input switching option is described.

Figure 9B:
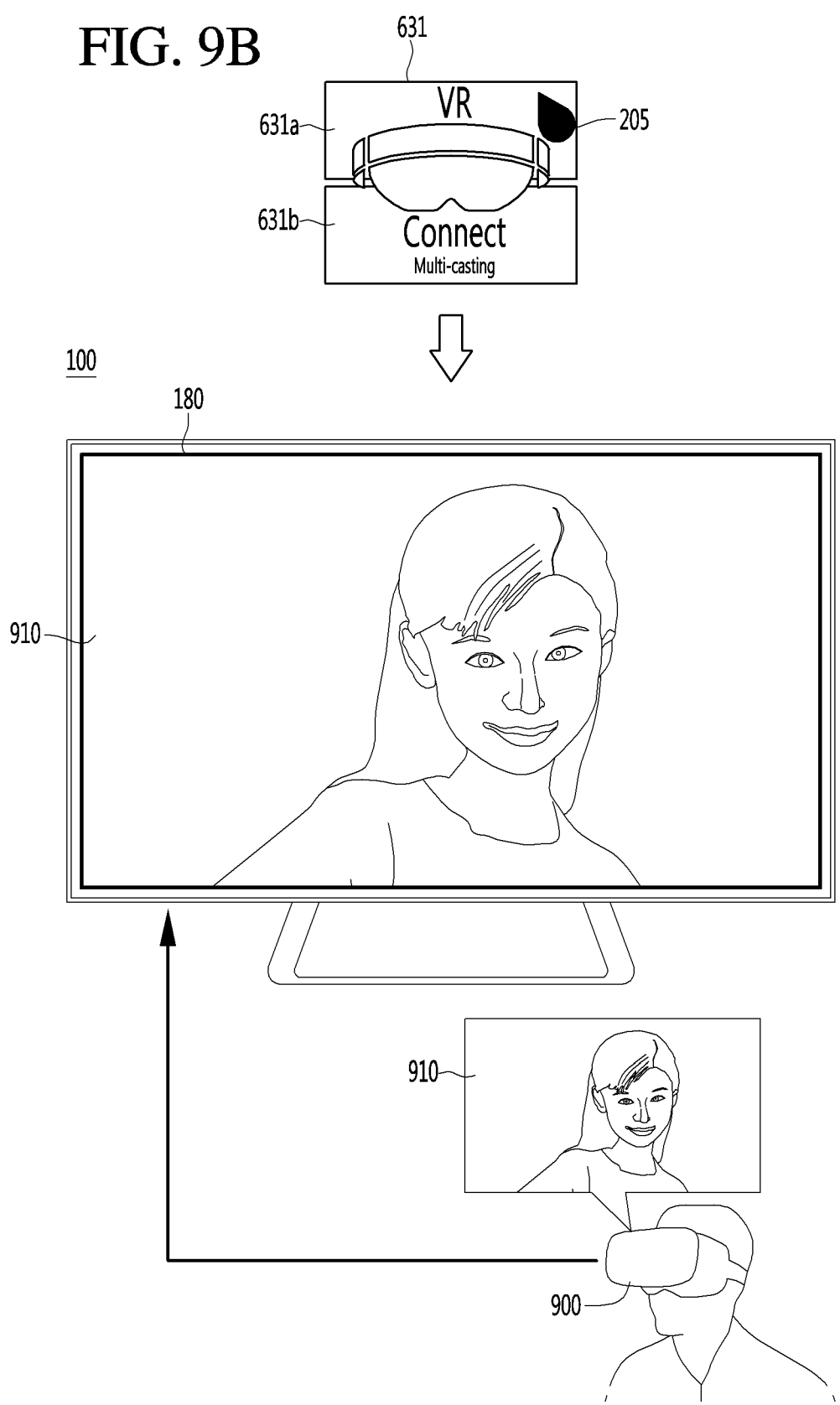
Figure 9C:
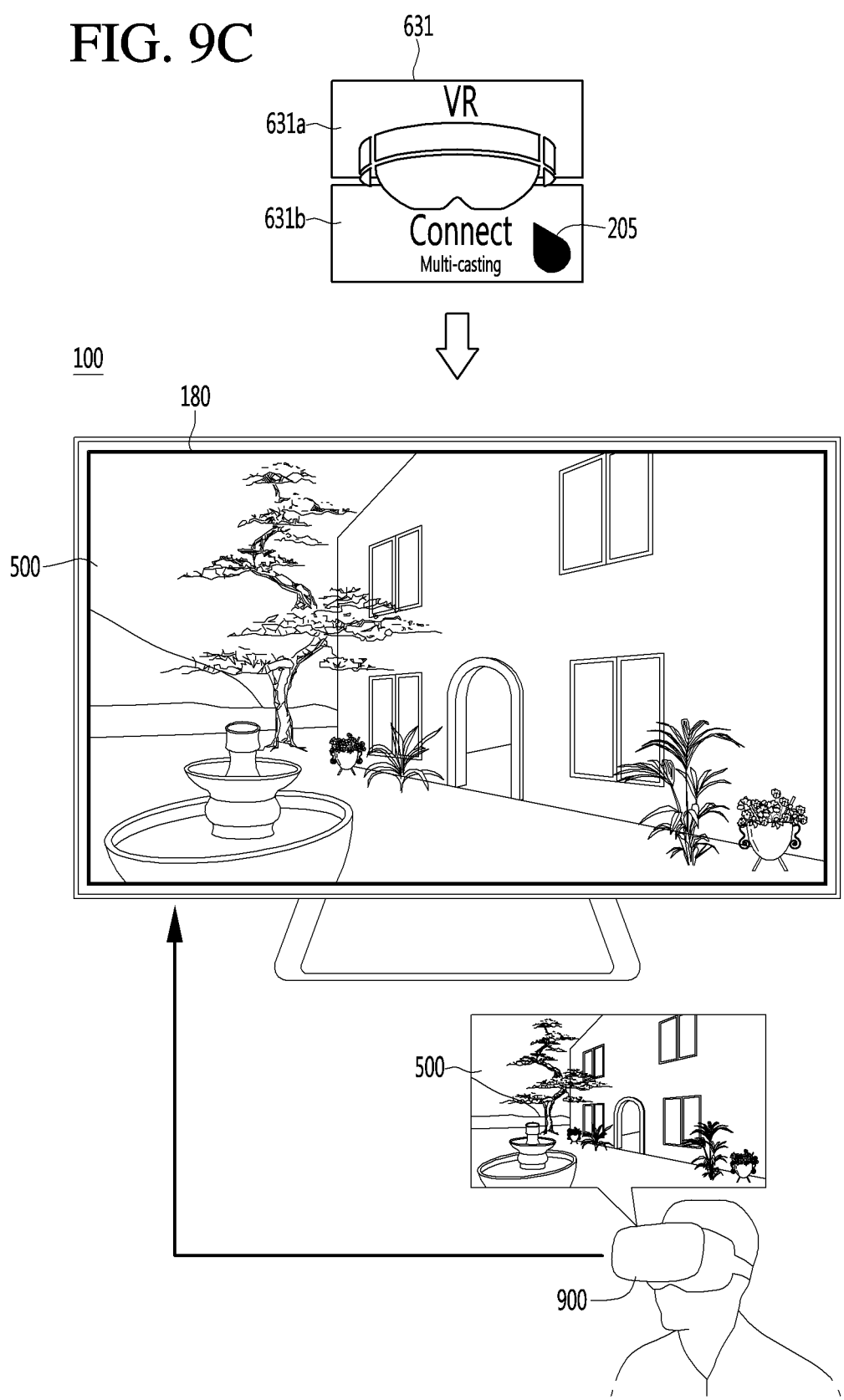

FIGS. 9A to 9C are views illustrating an example for utilizing an external input switching option relating to the transmission of an image provided from an external device according to an embodiment of the present invention.

Referring to FIG. 9A, the control unit 170 can receive an instruction for positioning the pointer 205 on the third external input item 630, from the remote control device 200. Accordingly, the pointer 205 displayed on a screen of the display unit 180 can be disposed on the third external input item 630.

If the pointer 205 is disposed on the third external input item 630, the control unit 170 can display the external input switching option 631 relating to screen mirroring on the third external input item 630.

Referring to FIG. 9B, the external input switching option 631 can include a first mirroring switching option 631a and a second mirroring switching option 631b.

The first mirroring switching option 631a can be an option for playing a VR image provided from a VR device 900 connected to the display device 100 through the display unit 180. If an instruction for selecting the first mirroring switching option 631a is received, the control unit 170, as shown in FIG. 9B, can receive a VR image 910 being played (or displayed) through the VR device 900 and display it through the display unit 180. That is, based on an instruction for selecting the first mirroring switching option 631a, the control unit 170 can switch the image 500 of the previously-displayed media content to the VR image 910.

The second mirroring switching option 631b can be an option for transmitting the image 500 of the media content being displayed by the display device 100 to the VR device 900. If an instruction for selecting the second mirroring switching option 63ba is received, the control unit 170, as shown in FIG. 9C, can transmit the image 500 of the media content being played through the display unit 180 to the VR device 900. Accordingly, a user who wears the VR device 900 can view the image 500 of the media content being played in the display device 100, through the VR device 900 more realistically.

Then, an example of another external input switching option is described.

FIGS. 10A to 10D are views illustrating an example for utilizing an external input switching option relating to the transmission of an image or audio provided from an external device according to an embodiment of the present invention.

Referring to FIG. 10A, the display unit 180 can display the image 500 of the media content and output the audio of the media content through the audio output unit 185. The audio output unit 185 can be a speaker.

The control unit 170 can receive an instruction for positioning the pointer 205 on the fourth external input item 640, from the remote control device 200. Accordingly, the pointer 205 displayed on a screen of the display unit 180 can be disposed on the fourth external input item 640.

If the pointer 205 is disposed on the fourth external input item 640, the control unit 170 can display the external input switching option 641 relating to the transmission of an image or audio provided from an audio output device, on the fourth external input item 640.

Referring to FIG. 10B, the external input switching option 641 can include an application execution screen switching option 641a and an audio switching option 641b.

The application execution screen switching option 641a can be an option for switching to an execution screen of an application provided from an audio output device connected to the display device 100. Herein, the application can be a music application for providing music related service. If an instruction for selecting the application execution screen switching option 641a is received, the control unit 170, as shown in FIG. 10B, can display the execution screen 1010 of a music application provided from an audio output device corresponding to the fourth external input item 640, through the display unit 180. That is, as receiving an instruction for selecting the application execution screen switching option 641a, the control unit 170 can switch the image 500 of the currently displayed media content to the execution screen 1010. According to another embodiment, the control unit 170 can not receive the execution screen 1010 of music application from an audio output device. That is, a music application supported by an audio output device can be installed in the display device 100 in advance. If the application execution screen switching option 641a is selected, the control unit 170 can execute the music application installed on the display device 100, and display the execution screen 1010 of the music application through the display unit 180.

A user can listen to desired music through the music application.

Figure 10C:
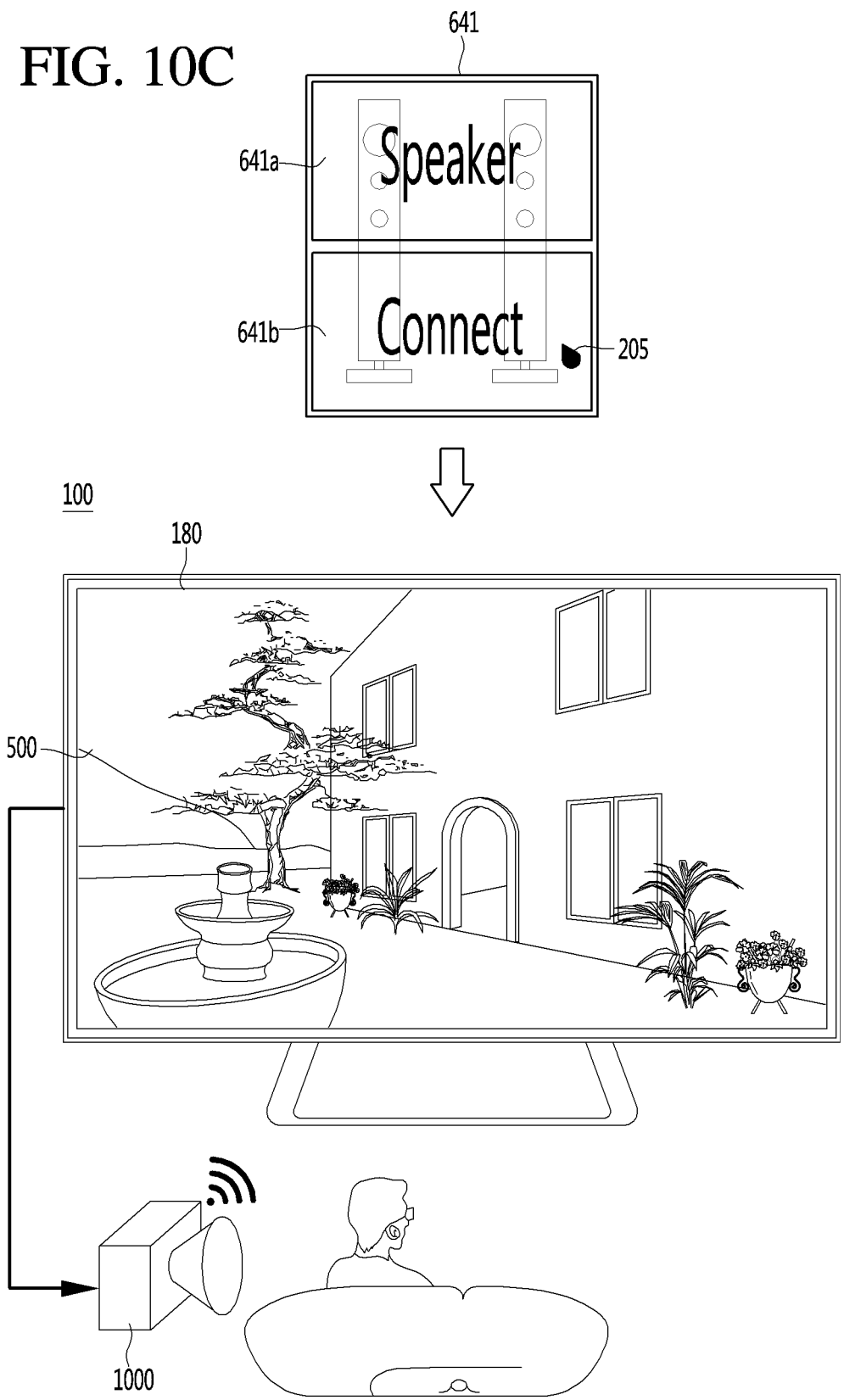

Moreover, if the audio switching option 641b is selected, the control unit 170, as shown in FIG. 10C, can transmit an audio corresponding to the image 500 of the media content being played, to the audio output device 1000 corresponding to the fourth external input item 640. In this case, the control unit 170 can turn off the power of the audio output unit 185 provided at the display device 100 and transmit the audio of the media content being played, to the audio output device 1000. That is, if the audio switching option 641b is selected, the audio of the media content is not outputted through the audio output unit 185 but is outputted through the audio output device 1000. The audio output device 1000 can be a sound bar disposed around the display device 100 but this is just an example.

A user can listen to more three-dimensional audio through the audio output device 1000 while viewing an image of media content through the large-sized display device 100.

Figure 10D:
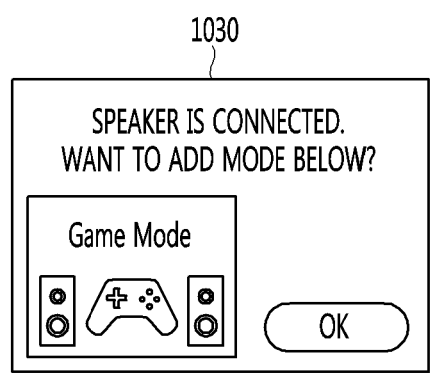

Moreover, if the audio output device 1000 is connected to the display device 100, the control unit 170, as shown in FIG. 10D, can display a message window 1030 for notifying the addition of a mode relating to an image of media content being played. If an image of media content in playback is an image provided from a game console, the message window 1030 can include information for representing that it is possible to control the output of audio in order for the audio output device 1000 to be optimized for a game mode.

Again, FIG. 5 is described.

Moreover, if an instruction for selecting at least one external input item from a plurality of external input items is received in operation S515, the control unit 170 of the display device 100 displays an image inputted from an external device corresponding to at least one selected external input item in operation S517.

According to an embodiment, if one of the plurality of external input items is selected, the control unit 170 can display an image provided from an external device corresponding to the selected external input item on the entire screen.

According to anther embodiment, if two of the plurality of external input items are selected, images provided from external devices corresponding to the selected two external inputs can be separately displayed on the split screens of the entire screen.

Operations S515 and S517 will be described with reference to the accompanying drawings.

FIGS. 11A to 11E are views illustrating various examples for displaying an image provided from an external device if at least one input item is selected from a plurality of external input items included in an external input menu according to an embodiment of the present invention.

Figure 11A:
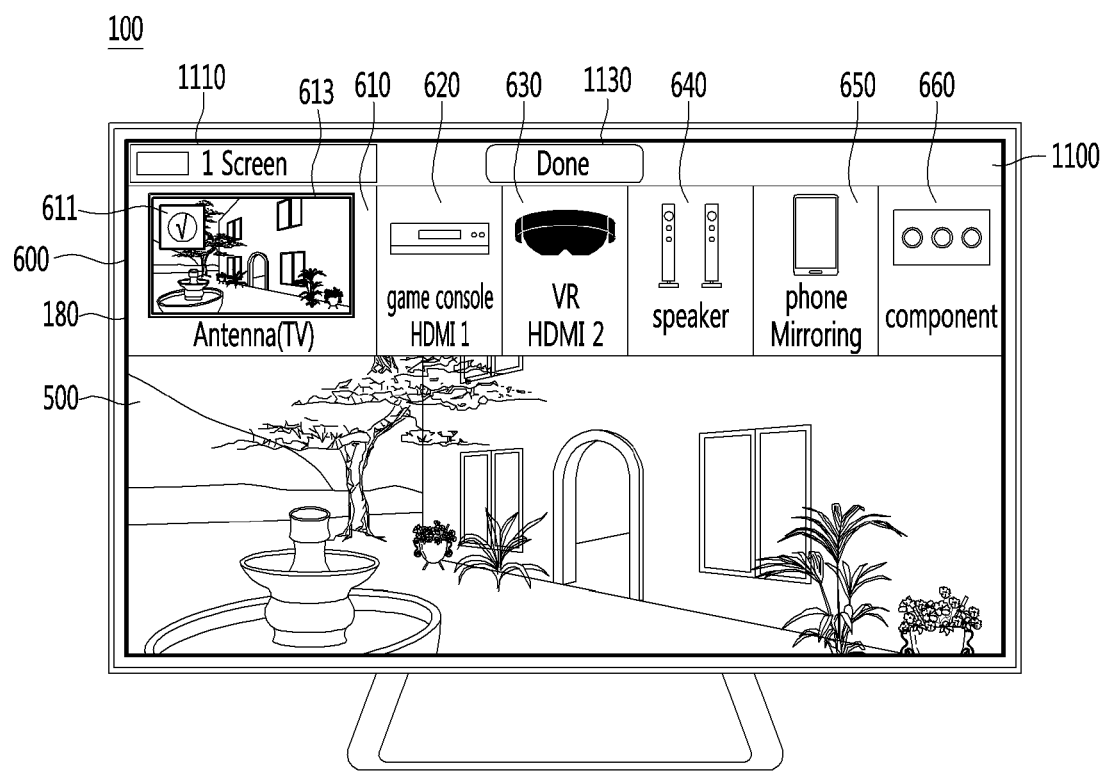
FIGS. 11A to 11E are views illustrating various examples for displaying an image provided from an external device if at least one input item is selected from a plurality of external input items included in an external input menu according to an embodiment of the present invention.

FIG. 11A is basically identical to FIG. 6B. Compared to FIG. 6B, a multi view setting menu 1100 can be further displayed in FIG. 11A. The multi view setting menu 1100 can be a menu for selecting at least one external input item from the plurality of external input items 610 to 660 included in the external input menu 600 to display an image provided from at least one external device. The multi view setting menu 1100 can include screen information 1110 for representing the number and arrangement of the split screen of the display unit 180 and a multi view execution button 1130. Referring to FIG. 11A, since the display unit 180 displays only the image 500 of the media content received through the tuner 131, it can display that the screen information 1110 is one screen.

Figure 11B:
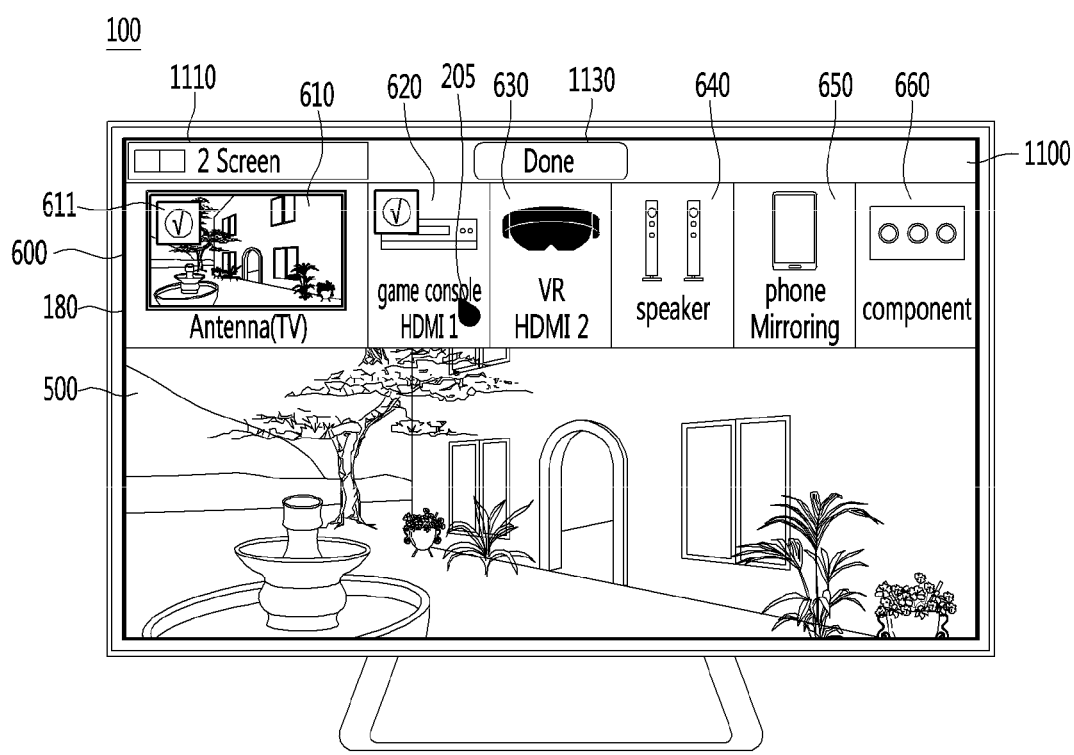

Referring to FIG. 11B, the second external input item 620 can be additionally selected. In this case, the control unit 170 can display an indicator for representing that the second external input item 620 is additionally selected, on the second external input item 620. Additionally, if the second external input item 620 is additionally selected, the screen information 1110 can represent that one screen is divided into two screens to provide an image of each external device.

Figure 11C:
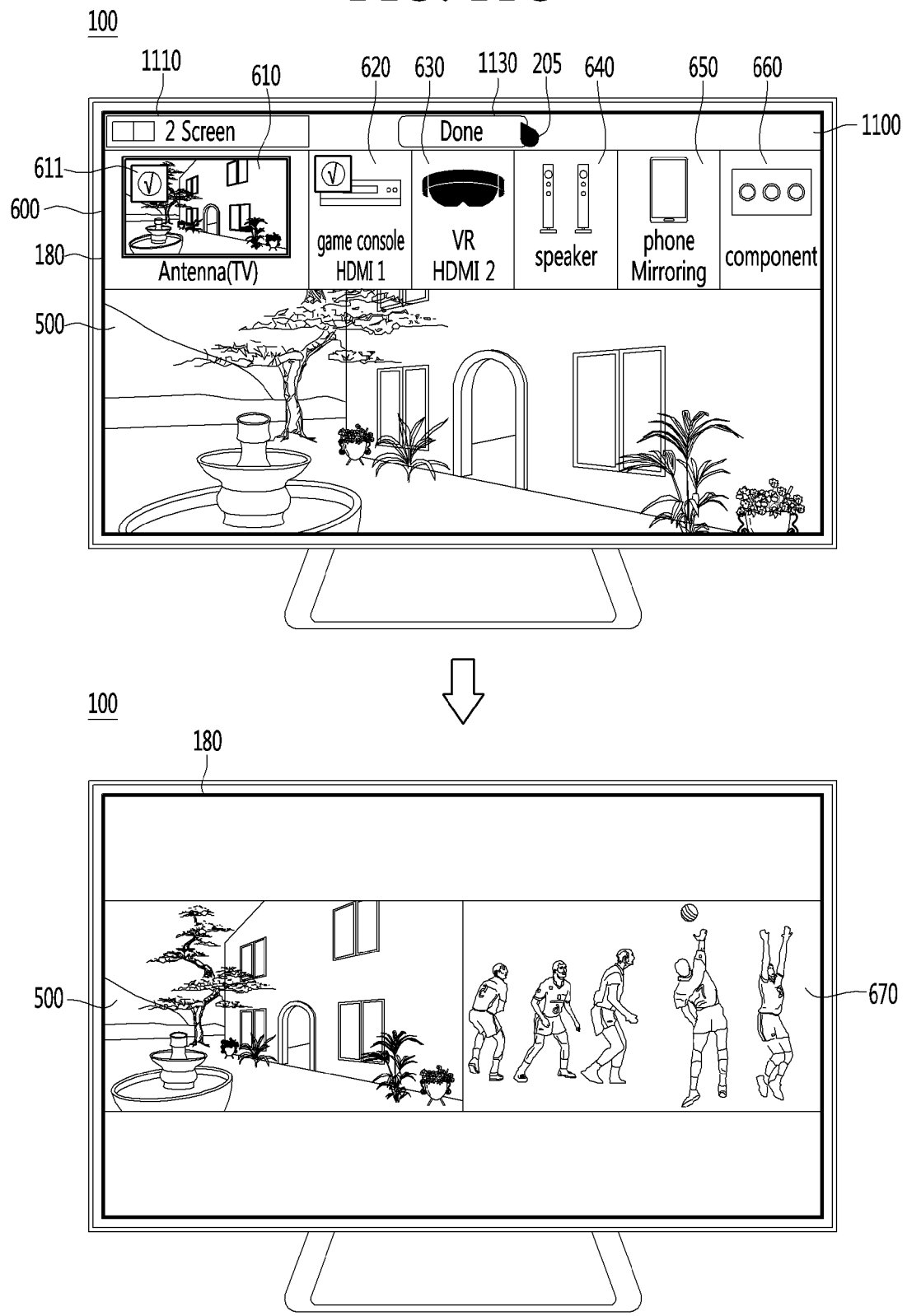

In this state, as shown in FIG. 11C, if an instruction for selecting the multi view execution button 1130 is received, the control unit 170 can display the image 500 of the currently played media content on the left screen of the entire screen, and display the game image 670 provided from a game console corresponding to the second external input item 620 on the right screen.

Figure 11D:
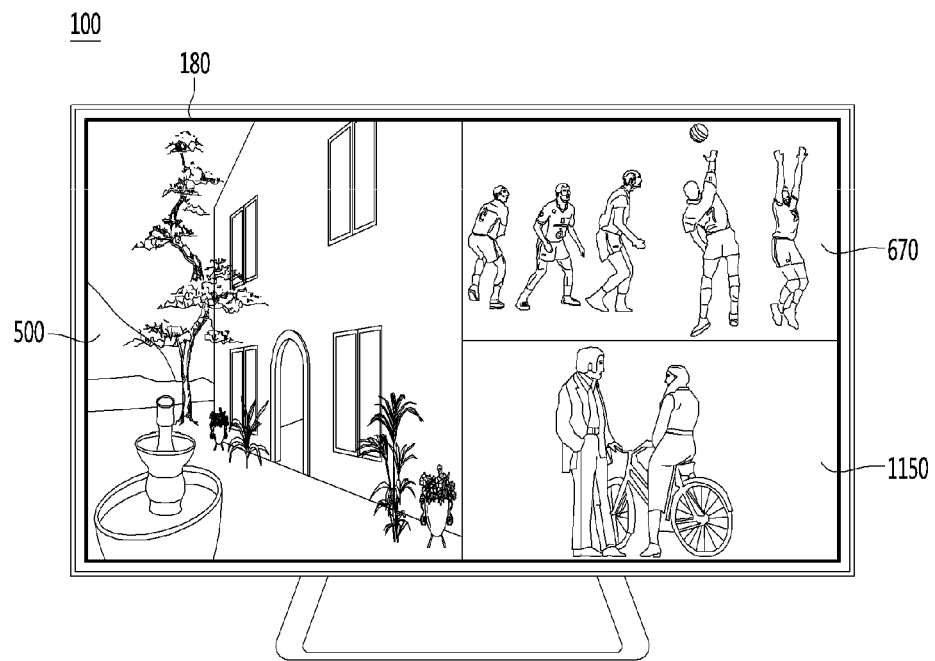

If three external input items are selected, the control unit 170, as shown in FIG. 11D, can display the image 500 of the currently played media content and the images 670 and 1150 provided from an external device corresponding to each external input item, on three split screens.

Figure 11E:
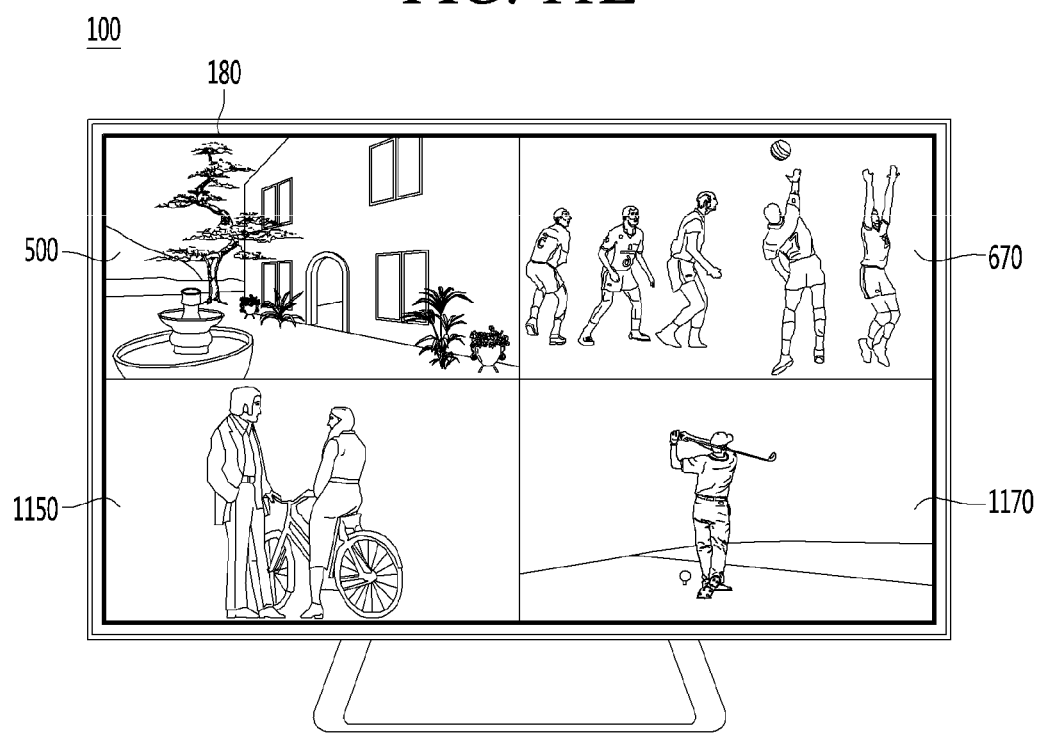

If four external input items are selected, the control unit 170, as shown in FIG. 11E, can display the image 500 of the currently played media content and the images 670, 1150, and 1170 provided from an external device corresponding to each external input item, on four split screens.

In such a way, a user can view at a glance various images provided from each external device by selecting at least one external input item from a plurality of external input items.

According to various embodiments of the present invention, a user can actively use an image provided from an external device connected to a display device in order to match user's preference.

Additionally, according to an embodiment of the present invention, an image displayed by a display device is transmitted to an external device through an external input menu to provide various viewing experiences to users.

According to an embodiment of the present invention, the above-mentioned method can be embodied as computer readable codes on a non-transitory computer readable recording medium having a program thereon. Examples of the computer readable recording medium include ROM, RAM, CD-ROM, magnetic tape, floppy disk, and an optical data storage device and also include carrier waves (e.g., transmission through the Internet).

Embodiments allow an image, which is provided from an external device connected to a display device, to be utilized actively according to user's preference.

Embodiments also transmit an image displayed by a display device to an external device through an external input menu to provide various viewing experiences to users.

In one embodiment, a display device includes: a display unit configured to display an image of media content; an external device interface unit configured to receive an image signal outputted from an external device connected to the display device; and a control unit configured to control the display unit and the external device interface unit, wherein the control unit displays a plurality of external input items, receives an instruction for positioning a pointer to one item among the plurality of external input items, displays a plurality of external input switching options on an external input item where the pointer is disposed according to the received instruction, and performs a function corresponding to a selected external input switching option among the plurality of external input switching options based on the image signal outputted from the external device.

The plurality of external input switching options can include a screen arrangement option for instructing which area in the entire screen of the display unit an image outputted from an external device corresponding to the external input item is to be disposed.

If the screen arrangement option is selected, the control unit can display the image of the media content and the image outputted from the external device on split screens.

If the pointer is disposed on the split screen, the control unit can display a close option for terminating the viewing of an image where the pointer is disposed and a size up option for displaying an image where the pointer is disposed on the entire screen and displaying the remaining image in a Picture In Picture (PIP) form.

The plurality of external input switching options can include: a first mirroring switching option for displaying an image being displayed by the external device through the display unit; and a second mirroring switching option for transmitting the image of the media content to the external device.

The plurality of external input switching options can include: an application execution screen switching option for displaying an execution screen of an application provided from the external device; and an audio switching option for transmitting an audio of the media content to the external device to allow the external device to output the audio.

The plurality of external input switching options can be different according to a type of the external device connected to the display device.

If two or more external input items are selected from the plurality of external input items, the control unit can display images outputted from external devices corresponding to the selected respective input items on split screens.

In another embodiment, an operating method of a display device includes: displaying an image of media content and a plurality of external input items; receiving an instruction for positioning a pointer to one item among the plurality of external input items; displaying a plurality of external input switching options on an external input item where the pointer is disposed according to the received instruction; and performing a function corresponding to a selected external input switching option among the plurality of external input switching options based on the image signal outputted from the external device.

The details of one or more embodiments are set forth in the accompanying drawings and the description below. Other features will be apparent from the description and drawings, and from the claims.

The above-described display device is not limited to the application of the configurations and methods of the above-described embodiments and the entire or part of the embodiments can be selectively combined and configured to allow various modifications.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a display configured to display an image of media content;
   an external device interface configured to receive an image signal from an external device; and
   a controller configured to control the display, wherein the controller is configured to:
   display a plurality of external input items on the display,
   receive an instruction for providing a pointer on the display at a first external input item of the displayed plurality of external input items,
   display a plurality of external input switching options at the first external input item, and
   perform a function corresponding to a selected external input switching option based on the image signal received from the external device,
   wherein the plurality of external input switching options include a screen arrangement option for identifying a specific area of the display in which to display an image received from an external device corresponding to the first external input item.

2. The display device according to claim 1, wherein when the screen arrangement option is selected, the controller controls the display to display, on first and second split screens, the image of the media content and the image received from the external device.

3. The display device according to claim 1, wherein the controller controls the display to display a close option and a size up option, the close option for terminating viewing of an image, and the size up option for displaying the image of the media content and displaying another image in a Picture In Picture (PIP) form.

4. The display device according to claim 1, wherein the plurality of external input switching options include:
   a first mirroring switching option for displaying, on the display, an image from the external device; and
   a second mirroring switching option for transmitting the image of the media content to the external device.

5. The display device according to claim 1, wherein the plurality of external input switching options include:
   an application execution screen switching option for displaying, on the display, an execution screen of an application received from the external device; and
   an audio switching option for transmitting audio of the media content to the external device.

6. The display device according to claim 1, wherein the plurality of external input switching options are different according to a type of the external device connected to the display device.

7. The display device according to claim 1, wherein when two or more external input items are selected from the plurality of external input items, the controller controls the display to display, on first and second split screens, images from external devices corresponding to the selected external input items.

8. A display device comprising:
   a display;
   an interface configured to receive an image from an external device; and
   a controller to control the display, wherein the controller is configured to:
   display a plurality of selectable items on the display,
   display information relating to a plurality of external input switching options at a first item of the plurality of selectable items, and
   perform a function corresponding to a selected external input switching option based on the image received from the external device, wherein the plurality of external input switching options include:
a first mirroring switching option for displaying an image from the external device; and
a second mirroring switching option for transmitting the image to the external device.

9. The display device according to claim 8, wherein in response to selecting a screen arrangement option, the controller to control the display to identify a specific area of the display in which to display an image received from the external device.

10. The display device according to claim 9, wherein the controller controls the display to simultaneously display, on first and second split screens, the image of media content and the image received from the external device.

11. The display device according to claim 10, wherein the controller controls the display to display a close option and a size up option, the close option for terminating viewing of an image, and the size up option for displaying an image and displaying a remaining image in a Picture In Picture (PIP) form.

12. A display device comprising:
a display configured to display an image of media content;
an external device interface configured to receive an image signal from an external device; and
a controller configured to control the display, wherein the controller is configured to:
display a plurality of external input items on the display,
receive an instruction for providing a pointer on the display at a first external input item of the displayed plurality of external input items,
display a plurality of external input switching options at the first external input item, and
perform a function corresponding to a selected external input switching option based on the image signal received from the external device,
wherein when two external input items are selected from the plurality of external input items, the controller is configured to display, on first and second split screens, images from external devices corresponding to the selected two external input items.

13. The display device according to claim 12, wherein the plurality of external input switching options include a screen arrangement option for identifying a specific area of the screen in which to display an image from an external device corresponding to the external input item.

14. The display device according to claim 13, wherein when the screen arrangement option is selected, the controller controls the display to display, on first and second split screens, the image of the media content and the image received from the external device.

15. The display device according to claim 14, wherein the controller controls the display to display a close option and a size up option, the close option for terminating viewing of an image, and the size up option for displaying the image of the media content and displaying another image in a Picture In Picture (PIP) form.

16. The display device according to claim 12, wherein the plurality of external input switching options include:
a first mirroring switching option for displaying, on the display, an image from the external device; and
a second mirroring switching option for transmitting the image of the media content to the external device.

17. The display device according to claim 12, wherein the plurality of external input switching options include:
an application execution screen switching option for displaying, on the display, an execution screen of an application received from the external device; and
an audio switching option for transmitting audio of the media content to the external device.

18. The display device according to claim 12, wherein the plurality of external input switching options are different according to a type of the external device connected to the display device.

* * * * *